United States Patent [19]

Sato et al.

[11] Patent Number: 5,537,662
[45] Date of Patent: Jul. 16, 1996

[54] ELECTRONIC MONTAGE COMPOSING APPARATUS

[75] Inventors: Shinichiro Sato, Fussa; Takashi Kojo; Yoshiyuki Murata, both of Ome, all of Japan

[73] Assignee: Casio Computer Co., Ltd., Tokyo, Japan

[21] Appl. No.: 62,994

[22] Filed: May 17, 1993

[30] Foreign Application Priority Data

May 29, 1992  [JP]  Japan .................................. 4-139468
Dec. 30, 1992  [JP]  Japan .................................. 4-359849

[51] Int. Cl.[6] .................................................. G06F 15/72
[52] U.S. Cl. ................................................................ 395/135
[58] Field of Search .................................. 395/133, 135, 395/155, 161; 345/113, 114

[56] References Cited

U.S. PATENT DOCUMENTS

| | | | |
|---|---|---|---|
| 4,791,581 | 12/1988 | Ohba | 364/521 |
| 4,885,702 | 12/1989 | Ohba | 364/521 |
| 4,913,539 | 4/1990 | Lewis | 352/87 |
| 5,057,019 | 10/1991 | Harvey | 434/155 |
| 5,247,610 | 9/1993 | Oshima et al. | 395/135 |
| 5,272,769 | 12/1993 | Strnatka et al. | 395/161 |
| 5,313,408 | 5/1994 | Goto | 364/514 |
| 5,375,195 | 12/1994 | Johnston | 395/135 |

FOREIGN PATENT DOCUMENTS

| | | |
|---|---|---|
| 0225729 | 6/1987 | European Pat. Off. . |
| 0275124 | 7/1988 | European Pat. Off. . |
| 3-129572 | 6/1991 | Japan . |
| 1564072 | 5/1979 | United Kingdom . |

OTHER PUBLICATIONS

Systems and Computer in Japan, vol. 19, No. 9, Sep., 1988, U.S., Noguchi et al, A Method of Generating Facial Expressions Using a Database–Driven Animation System.

*Primary Examiner*—Phu K. Nguyen
*Attorney, Agent, or Firm*—Frishauf, Holtz, Goodman, Langer & Chick

[57] ABSTRACT

A montage composing apparatus is provided for composing a desired picture of a human face without any complicated manipulations. The apparatus requires no operation for selecting and combining part patterns to compose the picture of a human face. Several sets of part numbers of patterns which composes a picture of a human face, are previously stored in a basic face ROM. One of set of part numbers is selected and stored in a RAM. Patterns corresponding to the part numbers stored in the RAM are read out from a pattern ROM and are combined in a composing memory to compose a picture of a human face. The composed picture of a human face is displayed on a display unit. When one of the patterns composing the picture of a human face displayed on the display unit is required to be replaced with another pattern, the part number of the pattern to be replaced is registered to the RAM. A pattern corresponding to the registered part number is read out from the pattern ROM, and combined in the composing memory to compose a picture of a human face with another pattern replacing the original pattern.

17 Claims, 29 Drawing Sheets

FIG.2

|  | | 01 | 02 | 03 | 04 |
|---|---|---|---|---|---|
| 1 | FACE OUTLINE | | | | |
| 2 | HAIR STYLE | | | | |
| 3 | EYES | | | | |
| ⋮ | | | | | |

FIG.3

| BASIC-FACE | OUTLINE | HAIR STYLE | EYES | NOSE | MOUTH |
|---|---|---|---|---|---|
| 1 | 01 | 01 | 01 | 01 | 01 |
| 2 | 01 | 02 | 03 | 04 | 05 |
| ⋮ | | | | | |
| 20 | 10 | 02 | 05 | 08 | 02 |

FIG.8

PART-PATTERN ROM

| NO.<br>PARTS | 01 | 02 | 03 | | 19 | 20 |
|---|---|---|---|---|---|---|
| FACE OUTLINE | | | | | | |
| HAIR STYLE | | | | | | |
| EYES | | | | | | |
| NOSE | | | | | | |
| MOUTH | | | | | | |
| | | | | | | |

FIG.9

BASIC-FACE/
NATIONALITY ROM

| NO.<br>NATIONALITY<br>(AREA) | | 01 | 02 | 03 |
|---|---|---|---|---|
| 1 | JAPAN | | | |
| 2 | IRAN<br>(MIDDLE<br>EAST) | | | |
| ⋮ | ⋮ | ⋮ | ⋮ | ⋮ |

FIG.10

BASIC-FACE PART-PATTERN NUMBERS

| PARTS<br>NO. | FACE<br>OUTLINE | HAIR<br>STYLE | EYES | NOSE | MOUTH |
|---|---|---|---|---|---|
| 1-01 | 20 | 20 | 20 | 20 | 20 |
| 1-02 | 11 | 03 | 15 | 12 | 14 |
| 1-03 | 11 | 04 | 15 | 14 | 15 |
| ⋮ | ⋮ | ⋮ | ⋮ | ⋮ | ⋮ |
| 100-10 | 01 | 05 | 06 | 03 | 02 |

FIG.11

BASIC-FACE/ ERA ROM

| ERA (NATION) | NO. | 01 | 02 | |
|---|---|---|---|---|
| 1 | SEVENTIES (JAPAN) | | | |
| 2 | SEVENTIES (U.S.A) | | | |
| | | | | |

FIG.12

BASIC-FACE/ OCCUPATION ROM

| OCCUPATION (NATION) | NO. | 01 | 02 | -- |
|---|---|---|---|---|
| 1 | GREEN-GROCERS | | | -- |
| 2 | PAINTERS | | | -- |
| | | | | |

FIG.13

BASIC-FACE/AGE ROM

| AGES \ PATTERNS | 01 | 02 | 0 |
|---|---|---|---|
| 1 | 1yr-6yrs (CHILDHOOD) | | | |
| 2 | 7yrs-12yrs (BOYHOOD) | | | |
| ⋮ | ⋮ | ⋮ | ⋮ | ⋮ |
| 7 | 40yrs-50yrs (MIDDLE AGE) | | | |
| 8 | | | | |

FIG.14

BASIC-FACE/SEX ROM

| SEX (NATION) \ NO. | 01 | 02 | -- |
|---|---|---|---|
| 1 | FEMALE | | | --- |
| 2 | MALE | | | |

FIG. 16

MOUTH PATTERN ROM

| | NO SOUND | MOUTH PATTERNS PRONOUNCING JAPANESE SOUNDS | | | MOUTH PATTERNS PRONOUNCING ENGLISH SOUNDS | | |
| --- | --- | --- | --- | --- | --- | --- | --- |
| | | A | I | U | A (éi) | B (bíː) | |
| 1 | | | | | | | |
| 2 | | | | | | | |
| 3 | | | | | | | |
| 50 | | | | | | | |

FIG.17

VOICE DATA ROM

| ITEM | | SOUND | VOICE DATA | | | | | |
|---|---|---|---|---|---|---|---|---|
| NATIONALITY | SEX | AGE | ONE CHARACTER | | | | WORD | |
| JAPAN | MALE | CHILD | (A) | (I) | (U) | (E) | (AI) | (AI)' |
| | | HIGH SCHOOL STUDENT | (A) | (I) | (U) | (E) | (AI) | (AI)' |
| | | ADULT | (A) | (I) | (U) | (E) | (AI) | (AI)' |
| U.S.A | FEMALE | CHILD | A (éi) | B (biː) | C (síː) | D (díː) | abandon əbǽndən | |
| | | HIGH SCHOOL STUDENT | A | B | C | D | abandon | |
| | | ADULT | A | B | C | D | abandon | |

FIG.18

NATIONALITY/LANGUAGE ROM

| | NATIONALITY | LANGUAGE |
|---|---|---|
| A | JAPAN | JAPANESE |
| B | U.S.A | ENGLISH |
| C | SPAIN | SPANISH |
| D | RUSSIA | RUSSIAN |
| E | MEXICO | SPANISH |
| | | |

FIG.19

SEX/AGE ROM

| SEX | | AGE | | |
|---|---|---|---|---|
| MALE | FEMALE | CHILD | HIGH SCHOOL STUDENT | ADULT |
| 0 | 1 | X | Y | Z |

FIG.20

(EXAMPLE)

| JAPANESE MALE ADULT |
|---|
| A  0  Z |

FIG.21

47 RAM

DISPLAY REGISTER 471

474 PERSONAL DATA

| | NATIONALITY | ERA | OCCUPATION | AGE |
|---|---|---|---|---|
| 1 | JAPAN | 1992 | NO | 2 |
| | SEX | FACE FEATURES | NAME | ADDRESS |
| | MALE | ROUND | NAOKI MURATA | |
| | PHONE NUMBER | HISTORY | HOBBY | |
| | | | | |
| 2 | NATIONALITY | ERA | OCCUPATION | AGE |
| | | | | |
| | SEX | FACE FEATURES | NAME | ADDRESS |
| | | | | |
| | PHONE NUMBER | HISTORY | HOBBY | |

475 MONTAGE DATA — PART NUMBER

| | OUTLINE | HAIR STYLE | EYES | NOSE | MOUTH |
|---|---|---|---|---|---|
| | RIGHT HAND | LEFT HAND | BODY | RIGHT LEG | LEFT LEG |
| | OUTLINE | HAIR STYLE | EYES | NOSE | MOUTH |
| | RIGHT HAND | LEFT HAND | BODY | RIGHT LEG | LEFT LEG |

476 LANGUAGE·SEX·AGE SOUND DATA NO. MOUTH PATTERN NO.

| LANGUAGE | SEX | AGE |
|---|---|---|
| A | — | X |
| (NI) | (N) | (SE) |
| (HO) | (I) | (O) |
| (SA) | (N) | (TO) |
| (MU) | (TA) | (NA) |
| (RA) | | (O) (KI) |

473 BASIC FACE

| OUTLINE | HAIR STYLE | EYES | NOSE | MOUTH |
|---|---|---|---|---|

FIG.22

MOUTH PATTERN/TIME RAM

| ADDRESS | MOUTH PATTERN | TIME(SEC) |
|---------|---------------|-----------|
| 1 | 1 | 3 SEC |
| 2 | 5 | 2 SEC |
| 3 | 8 | 3 SEC |
| 4 | 2 | 1 SEC |
| 5 | 10 | 2 SEC |
| 6 | 3 | 3 SEC |
| 7 | 6 | 5 SEC |
|   |   |   |

FIG.33
|  | 01 | 02 | 03 |
|---|---|---|---|
| JAPAN |  |  |  |
| OUTLINE | 20 | 11 | 11 |
| HAIR STYLE | 20 | 13 | 14 |
| EYES | 20 | 15 | 13 |
| NOSE | 20 | 12 | 14 |
| MOUTH | 20 | 14 | 15 |

FIG.34(A)  SELF INTRODUCTION KEY

```
NATIONALITY : JAPAN      LANGUAGE : JAPANESE
ERA : 1992               VOICE QUALITY :
OCCUPATION : NON                    MALE,CHILD
AGE : 2
SEX : MALE
FEATURE : ROUND FACE
NAME : NAOKI MURATA
```

 (NI)

FIG.34(B)  A PREDETERMINED TIME HAS LAPSED

```
NATIONALITY : JAPAN      LANGUAGE : JAPANESE
ERA : 1992               VOICE QUALITY :
OCCUPATION : NON                    MALE,CHILD
AGE : 2
SEX : MALE
FEATURE : ROUND FACE
NAME : NAOKI MURATA
```

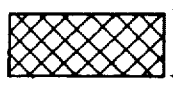 (HO)

FIG.34(C)  A PREDETERMINED TIME HAS LAPSED

```
NATIONALITY : JAPAN      LANGUAGE : JAPANESE
ERA : 1992               VOICE QUALITY :
OCCUPATION : NON                    MALE,CHILD
AGE : 2
SEX : MALE
FEATURE : ROUND FACE
NAME : NAOKI MURATA
```

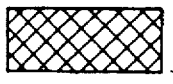 (N)

5,537,662

ELECTRONIC MONTAGE COMPOSING APPARATUS

BACKGROUND OF THE INVENTION

1. Field of the Invention

The present invention relates to an electronic montage composing apparatus for composing a picture of a human face and the like.

2. Description of the Related Art

An electronic apparatus with a montage composing function has been put to practical use, which is used to store data of a name card, and is further used to compose and store a portrait of a person.

In such an electronic apparatus with a montage composing function, several sorts of component parts for composing a portrait or a human face montage are prepared and memorized in a part memory. These component parts include eye parts, nose parts, mouth parts, eyebrow parts, face-outline parts and hair-style parts and the like. When a portrait is composed, appropriate component parts are selectively read out from the part memory, and are combined on a display unit to compose a portrait. Conventionally, a desired pattern of a component part is selected from among the component parts memorized in the part memory, and component parts of desired patterns are combined to compose the portrait. More specifically, component parts of desired patterns are selected one by one from among the memorized component parts in order of, for example, a face-outline part, a hair-style part, an eyebrow part, an eye part and so on, and are successively combined into a montage.

In the conventional apparatus with a montage composing function, a part selecting key is operated at first to select a sort of component parts which compose a particular portion of a portrait. Then a pattern selecting key is operated to select a desired pattern of the selected component part from the component parts of the sort which is selected by operation of the part selecting key. In this manner, the part selecting key and the pattern selecting key are alternatively operated for selecting appropriate component parts to compose a portrait or a human face montage. As described above, with the conventional apparatus, the part selecting key and the pattern selecting key must be operated to compose the montage from the very first on the display unit, on which nothing is displayed. Therefore, it will take much of time to complete a montage of a desired human face. In addition, since no reference is prepared for selecting component parts of desired patterns from among a plurality of component parts, the part selecting key and the pattern selecting key are often operated in error. Accordingly, with the conventional electronic apparatus, it is almost impossible to precisely compose a desired montage in a short time.

SUMMARY OF THE INVENTION

The present invention has been made to overcome the above mentioned inconvenience, and has an object to provide a montage composing apparatus, which can be used by any user to compose a desired montage or portrait with easy operations, and which provides the user with no puzzling operation.

According to one aspect of the invention, there is provided a picture composing apparatus which comprises:

part memory means for storing a plurality of element parts for composing a picture of a human face, each element part having plural sorts of patterns and being represented by a part number;

basic-face memory means for previously storing a plurality of basic-face data, each basic-face data being composed of a combination of part numbers of element parts which have respectively predetermined patterns stored in said part memory means and compose a picture of a basic face;

selecting means for selecting one of the basic-face data stored in said basic-face memory means;

display means for displaying a picture of a basic face based on the basic-face data selected by said selecting means; and replacing means for replacing the element part of a predetermined pattern of the basic face displayed on said display means with the element part of another pattern stored in said part memory means.

With the above structure of the picture composing apparatus, a desired montage of a human face can be obtained without any complicated operation.

According to another aspect of the invention, there is provided a picture composing apparatus which comprises:

element parts for composing a picture of a human face, each element part having plural sorts of patterns being represented by a part number, the element parts including a mouth part, and the mouth part having plural sorts of patterns, each pattern of the mouth part being corresponding to pronunciation of a fundamental sound;

part memory means for storing plural sorts of patterns of each of said element parts including the mouth part;

pattern selecting means for selecting a pattern of an element part from among the plural sorts of patterns of the element part stored in said part memory means, and for successively selecting a plurality of patterns of the mouth part from among the plural sorts of patterns of the mouth part stored in said part memory means;

basic-face memory means for storing basic-face data, each basic-face data being composed of part numbers of element parts having patterns selected by said pattern selecting means;

mouth-patterns memory means for storing, in order of selection, a plurality of patterns of the mouth part selected by said pattern selecting means;

basic-face selecting means for selecting a basic-face data from among the basic-face data stored in said basic-face memory means;

display means for displaying a picture of a basic face based on the basic-face data selected by said basic-face selecting means;

replacing means for successively replacing the patterns of the mouth part of the basic face displayed on said display means with another pattern of the mouth part stored in said mouth-pattern memory means.

With the above structure of the picture composing apparatus, a montage of a human face which moves in response to reproduced sounds can be obtained with simple operation.

According to yet another aspect of the invention, there is provided a picture composing apparatus comprising:

element parts for composing a picture of an object, each element part having plural sorts of patterns;

part memory means for storing plural sorts of patterns of each of said element parts;

basic-object memory means for previously storing a plurality of basic objects, each basic object being composed of a combination of the element parts which have respectively predetermined patterns stored in said part memory means;

selecting means for selecting one of the basic objects stored in said basic-object memory means;

display means for displaying a picture of the basic object selected by said selecting means; and replacing means for replacing the element part of a predetermined pattern of the basic object displayed on said display means with the element part of another pattern stored in said part memory means.

With the above structure of the picture composing apparatus, a desired montage of a given object can be obtained without any complicated operation.

The other objects and features of the present invention will become understood from the following description with reference to the accompanying drawings.

BRIEF DESCRIPTION OF DRAWINGS

FIG. 2 is a view showing a part-pattern ROM of the montage composing apparatus in which part patterns are stored;

FIG. 3 is a view showing a basic-face ROM of the montage composing apparatus in which basic face parts are stored;

FIG. 8 is a schematic view showing a part-pattern ROM of the second embodiment of FIG. 6 in which part patterns are stored;

FIG. 9 is a schematic view showing a basic face/nationality ROM in which basic faces of various nationalities are stored;

FIG. 10 is a schematic view showing a part-pattern number ROM in which numbers of part-patterns used for composing basic faces of various nationalities;

FIG. 11 is a schematic view showing a basic face/era ROM in which basic faces of various eras are stored;

FIG. 12 is a schematic view showing a basic face/ occupation ROM in which basic faces of males or females of various occupations are stored;

FIG. 13 is a schematic view showing a basic face/age ROM in which basic male faces and basic female faces of various ages are stored;

FIG. 14 is a schematic view showing a basic face/sex ROM in which basic male faces and basic female faces are stood;

FIG. 16 is a schematic view showing a mouth-pattern ROM in which various mouth patterns are stored;

FIG. 17 is a schematic view showing a voice-data ROM in which various voice data are stored;

FIG. 18 is a schematic view showing a nationality/ language ROM in which relationships between nationalities and languages are stored, and further language codes representing the relationships are stored;

FIG. 19 is a schematic view showing a sex/age ROM in which age codes and sex codes are stored;

FIG. 20 is a view showing an example of a combination of a sex code, an age code and a language code;

FIG. 21 is a schematic view showing a structure of a RAM in which various data are stored;

FIG. 22 is a schematic view showing a mouthpattern/time RAM in which relationships between mouth patterns and time lapses are stored;

FIG. 33 is a schematic view showing an indication on a display unit;

FIGS. 34(S)–34(C) are schematic views showing the transition of indications on the display unit and sounding states when a self-introduction key is operated.

PREFERRED EMBODIMENTS

Now, a first embodiment of a montage composing apparatus according to the present invention will be described with reference to FIGS. 1–5.

Figure 1:
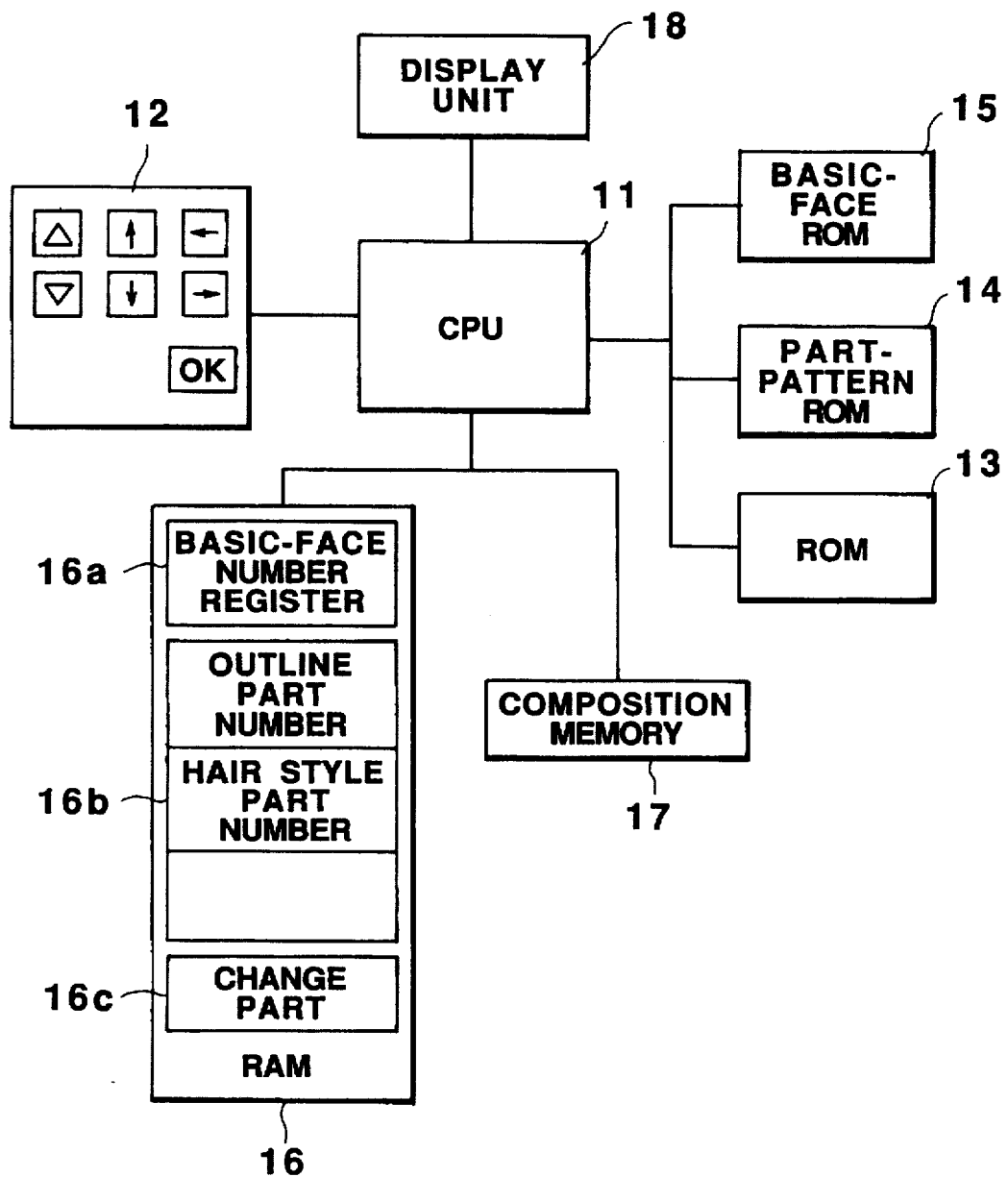
FIG. 1 is a block diagram of an electronic circuit of a first embodiment of a montage composing apparatus according to the present invention.

FIG. 1 is a block diagram of an electronic circuit of the first embodiment of the montage composing apparatus. The montage composing apparatus is provided with a central processing unit (CPU) 11. Receiving a key-operation signal from a key input unit 12, the CPU 11 controls operations of peripheral circuits connected thereto in accordance with a program stored in a ROM 13. The CPU 11 is connected with the key input unit 12, the ROM 13, a part-pattern ROM 14, a basic-face ROM 15, a RAM 16, a composition memory 17 and a display unit 18.

A human face is divided into various component parts such as a face outline part, a hair style part, an eye part and a nose part and the like. Various part patterns are prepared for each of these component parts, and form a group of part patterns. Each of the part patterns is assigned with a predetermined pattern number, and is stored together with the pattern number in the part-pattern ROM 14 at a predetermined position.

FIG. 2 is a view showing the part-pattern ROM 14 of the montage composing apparatus in which the part patterns are stored. In the present embodiment of the montage composing apparatus, for example, a face outline part of an egg shaped (oval) pattern is stored at an address "01" of the face outline part, and a face outline part of a square pattern is stored at an address "02" of the face outline part. A hair style part of a boyish hair pattern is stored at an address "01" of the hair style part, and a hair style part of a long hair pattern is stored at an address "02" of the hair style part.

Further in the present embodiment of the montage composing apparatus, a face outline part, a hair style part, an eye part, a nose part and so on are selected respectively from the relevant groups of part patterns, and are combined into a basic face. A plurality of sets of basic faces are prepared. As shown in FIG. 3, 20 sets of the basic faces are prepared and stored in the basic-face ROM 15. In other words, 20 sets of part numbers which represent part patterns composing basic faces are prepared and are stored in the basic-face ROM 15. The basic-face ROM 15 of FIG. 3 illustrates that a first basic face is composed of a face outline part, a hair style part, an eye part, a nose part and a mouth part, which parts are stored at the respective addresses "01" of the part-pattern ROM 14. Further, the basic-face ROM 15 of FIG. 3 shows that a second basic face is composed of a face outline part stored at an address "01" of the part-pattern ROM 14, a hair style part stored at an address "02", an eye part stored at an address "03", a nose part stored at an address "04" and a mouth part stored at an address "05".

In the basic-face ROM 15, a leading address of each part pattern may be stored, and the leading address data may be used for arranging pattern composition.

The RAM 16 is provided with a basic-face number register 16a, a part number register 16b and a change part register 16c. In the basic-face number register 16a is registered a face number representing a basic-face which is selected by a user. In the part number register 16b are registered part numbers which represent part patterns composing the basic face selected by the user. In other words, part numbers representing part patterns which compose the basic face corresponding to the face number registered in the basic-face number register 16a. In the change part register 16c is stored a part number of a part pattern to be changed in the part number register 16b.

The composition memory 17 is used for combining part patterns to compose a face pattern, which part patterns are read out from the part-pattern ROM 14 in correspondence with part numbers registered in the part number register 16b. The face pattern composed in the composition memory 17 is displayed on the display unit 18.

The key input unit 12 is provided with basic-face selecting keys "Δ" and "∇" for selecting a face number from numbers (from 1 to 20), change-part selecting keys "↑" and "↓" for selecting a part number of a part pattern to be changed from among part numbers registered in the change part register 16c, pattern changing keys "77" and "→" for changing a part number of a part pattern to be changed and an OK key "OK" for indicating that a composing process of a face pattern has been finished.

OPERATION OF FIRST EMBODIMENT

The first embodiment of the montage composing apparatus will be described with reference to flow charts of FIGS. 4–5.

Figure 4:
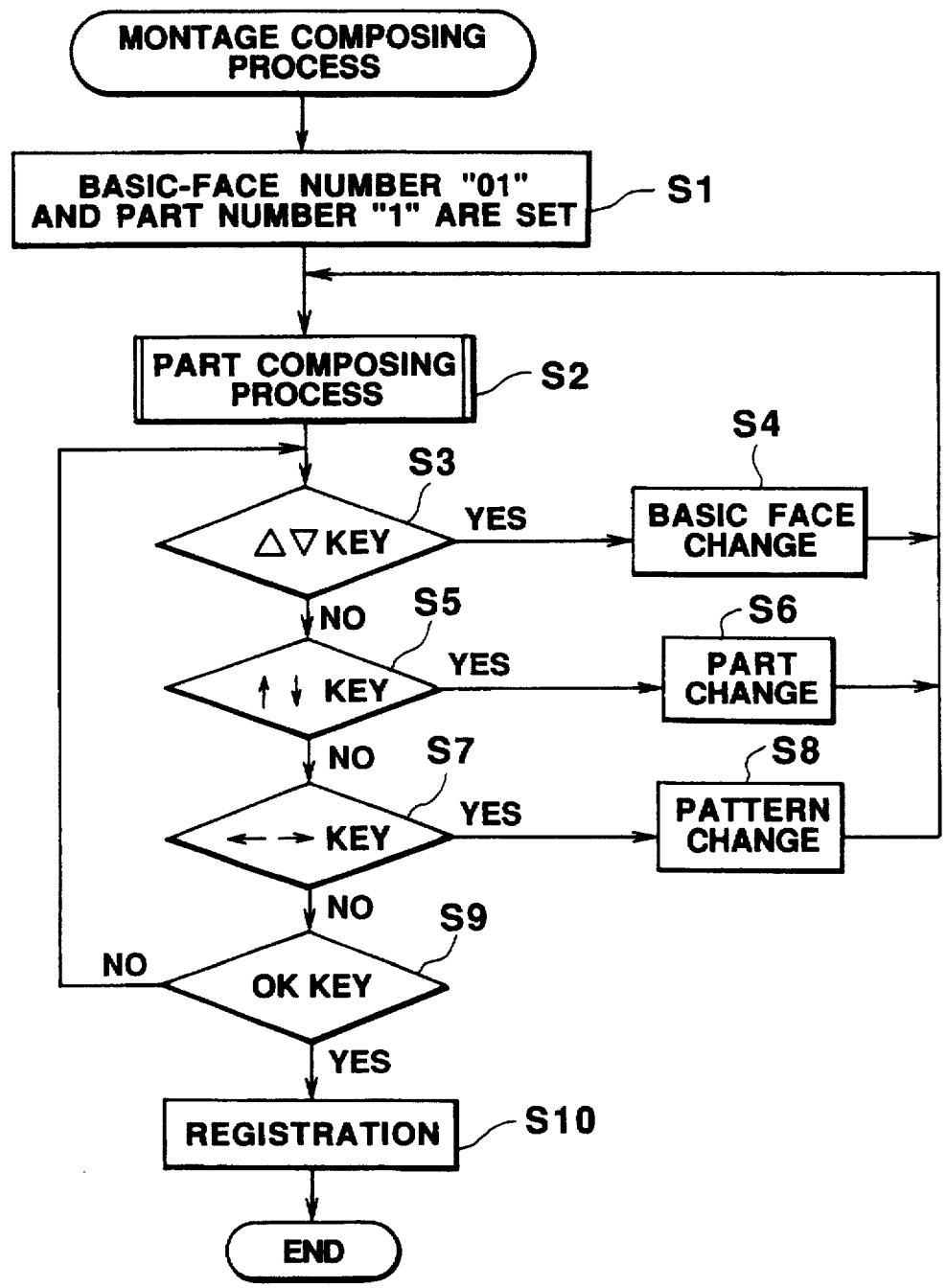
FIG. 4 is a flow chart of a montage composing process of the montage composing apparatus.

FIG. 4 is a flow chart of the montage composing process of the montage composing apparatus. When the key input unit 12 is operated and the CPU 11 is set to a montage composing mode, the basic-face number register 16a of the RAM 16 is initialized, whereby the face number "1" of the first basic face is set thereto, and further, a part number "1" indicating that a face outline part is to be changed is registered in the change part register 16c, at step S1 of the flow chart of FIG. 4.

Part numbers of part patterns composing the first basic face of the face number "1", which has been registered in the basic-face number register 16a, are read out from the basic-face ROM 15. The read out part numbers of part patterns (part pattern numbers) are written into the part number register 16b.

A part composing process for composing part patterns is executed at step S2 in accordance with the part numbers of the part patterns (part pattern numbers) written into the part number register 16b.

Figure 5:
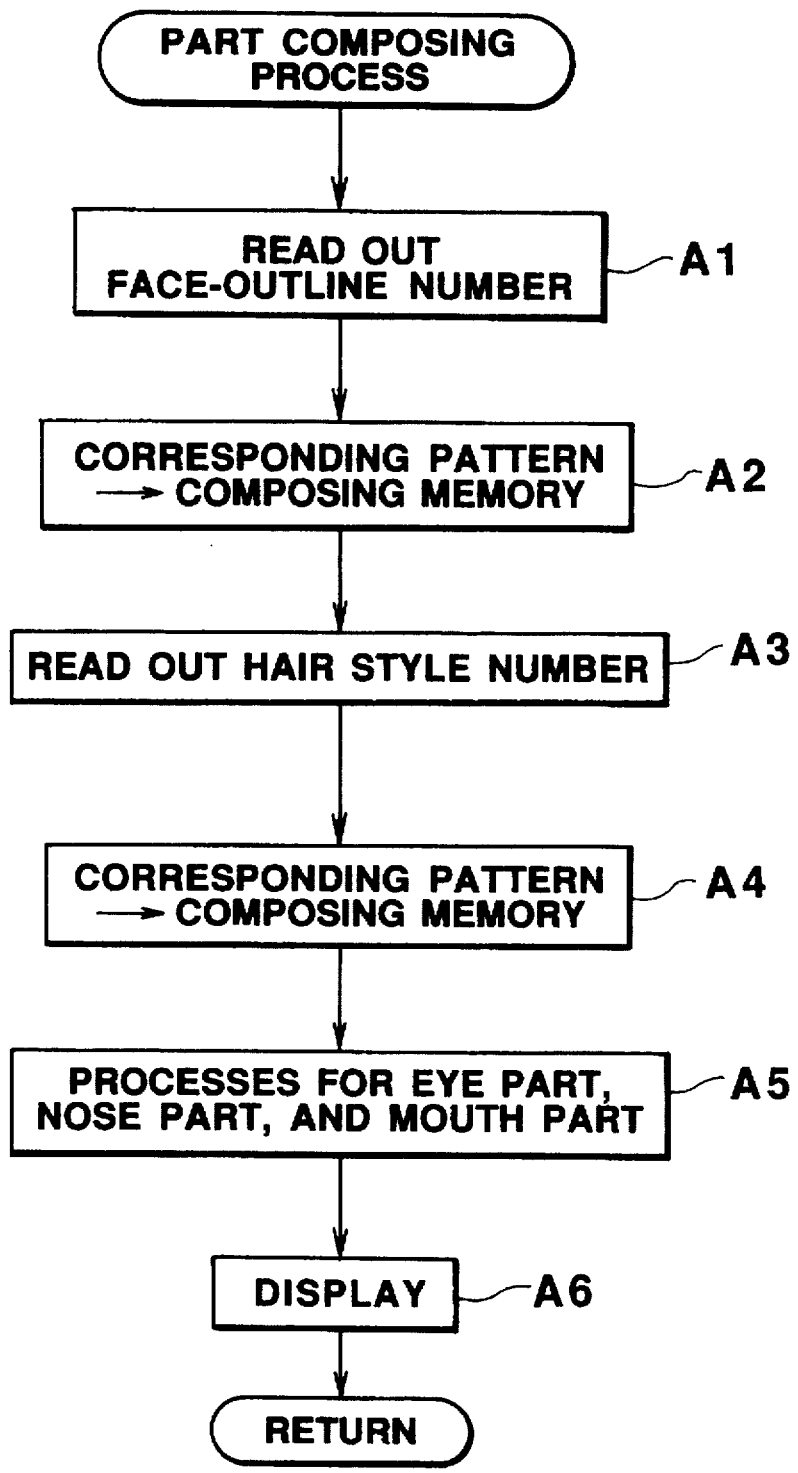
FIG. 5 is a flow chart of a part-pattern combining process performed in the montage composing process of the montage composing apparatus.

FIG. 5 is a flow chart of the part composing process, which is executed in the montage composing process of the montage composing apparatus. When part numbers of part patterns composing the first basic face are registered in the part number register 16b, the registered part number of part patterns (part-pattern number) are successively referred to. Referring to part numbers of part patterns of a face outline part, a hair style part and so on, part patterns are successively read out from the part-pattern ROM 14, and are transferred to the composition ROM 17. The read out part numbers of part patterns (part pattern numbers) are written into the part number register 16b at steps A1–A4 of FIG. 5.

In the composition memory 17, the part patterns composing the first basic face are combined into the first basic face at step A5, and the first basic face is displayed on the display unit 18 at step A6, which basic face is composed of the part patterns stored at addresses "01" of the basic-face number ROM 15, which addresses are common to every part.

When the basic-face selecting key "∇" of the key input unit 12 is operated at step S3 of the flow chart of FIG. 3, the face number registered in the basic-face number register 16a is changed from "1" to "2" at step S4. Part numbers of part patterns composing the basic face of the face number "2" are read out from the basic-face ROM 15, and are written into the part number register 16b of the RAM 16.

Part patterns corresponding to the part numbers (part pattern numbers) written into the part number register 16b are read out from the part-pattern ROM 14, and are subjected to the part composing process to be executed in the composition memory 17. A second basic face of the face number "2" is displayed on the display unit 18 at step S2. As shown in FIG. 3, the second basic face is composed of part patterns such as a face-outline part stored at an address of "01", a hair style part at an address of "02", an eye part at an address of "03", a nose part at address of "04" and a mouth at address of "05".

When the basic-face selecting key "∇" or "∇" of the key input unit 12 is operated, processes at steps S2 to S4 are repeatedly executed, whereby a plurality of basic faces, each of which is previously stored as a combination of part numbers in the basic-face ROM 15, are successively composed and displayed on the display unit 18. In this way, a user can compose and display on the display unit 18 a basic face which is like his (or her) desired face.

When either the change-part selecting key "↑" or "↓" of the input unit 12 is operated, a part number of a part pattern (a part pattern number) registered in the change part register 16c of the RAM 16 can be freely changed to another part number. For example, when the user wants to change the eye part of the basic face which is displayed at steps S2 to S4 as a face like his desired face on the display unit 18, he sets, at steps S5 and S6, to the change part register 16c a part number "3" by operating either the change-part selecting key "↑" or "↓" which number "3" indicates that a part to be changed is an eye part.

Further, when either the pattern changing key "←" or "→" is operated at step S7, the part number of the part pattern (part pattern number) of a relevant part register (in this case, "eye part") of the part number register 16b, which is indicated in the changing part register 16c, is changed. The "eye" pattern corresponding to the changed part number is read out from the part-pattern ROM 14, and is transferred to the composition memory 17 at step S8.

Following the above processes, the user can make amendment only to the part of the basic face which is different from his desired pattern, and can display on the display unit 18 a new basic face with the amended part.

When the user further wants to change a pattern of another part of the new basic face, he operates one of the change-part selecting keys "↑" and "↓" to change the part number registered in the change part register 16c, and then operates one of the pattern changing keys "←" and "→" to change a part number of the part pattern (a part pattern number) of a given part register (in this case, "eye part") of the part number register 16b. In this way, every part of the basic face displayed on the display unit 18 can be selectively changed to any pattern (at steps S5 to S8).

Confirming that a face having parts of patterns desired by the user has been obtained, the user operates the OK key of the input key unit 12 at step S9, thereby the part composing process is finished and a face pattern retained in the composite memory 17 is registered in the RAM 16 at step S10.

SECOND EMBODIMENT

Hereafter, a second embodiment of the montage composing apparatus according to the present invention will be described with reference to FIGS. 6–35.

Figure 6:
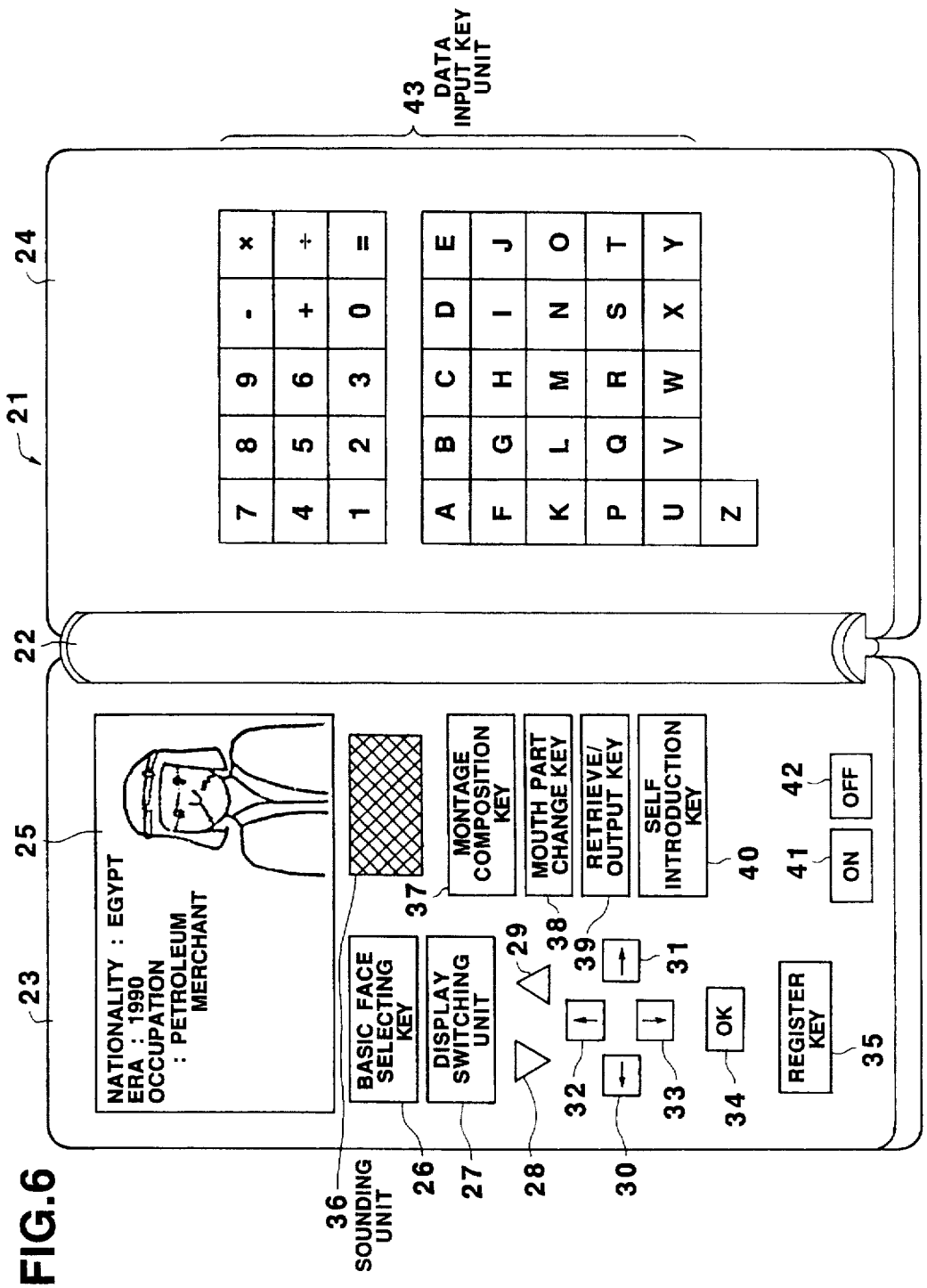
FIG. 6 is a plane view of an electronic note book incorporating a second embodiment of the montage composing apparatus according to the present invention.

FIG. 6 is an external view of an electronic note book incorporating the second embodiment of the montage composing apparatus according to the present invention. The electronic note book 21 is composed of a front casing 23 and a rear casing 24, both being connected to each other through a hinge 22. The front casing 23 is provided with a liquid crystal display (LCD) unit 25. At a lower portion to the LCD unit 25, there are provided a basic face selecting key 26 and a display switching key 27, and a △ key 28 and a ▽ key 29. Further, at a lower portion of the △ key 28 and ▽ key 29, there are provided a left indicating arrow key 30, a right indicating arrow key 31, a top indicating arrow key 32, a bottom indicating arrow key 33, an OK key 34 and a register key 35. Furthermore, at a lower portion to the LCD unit 25, there are provided a sounding unit 36, a montage composing key 37, a mouth part change key 38, a retrieve/output key 39, a self introduction key 40, an ON key 41 and an OFF key 42. On the rear casing 24, there is provided a data input key unit 43 including numerical keys and alphabet keys.

Figure 7:
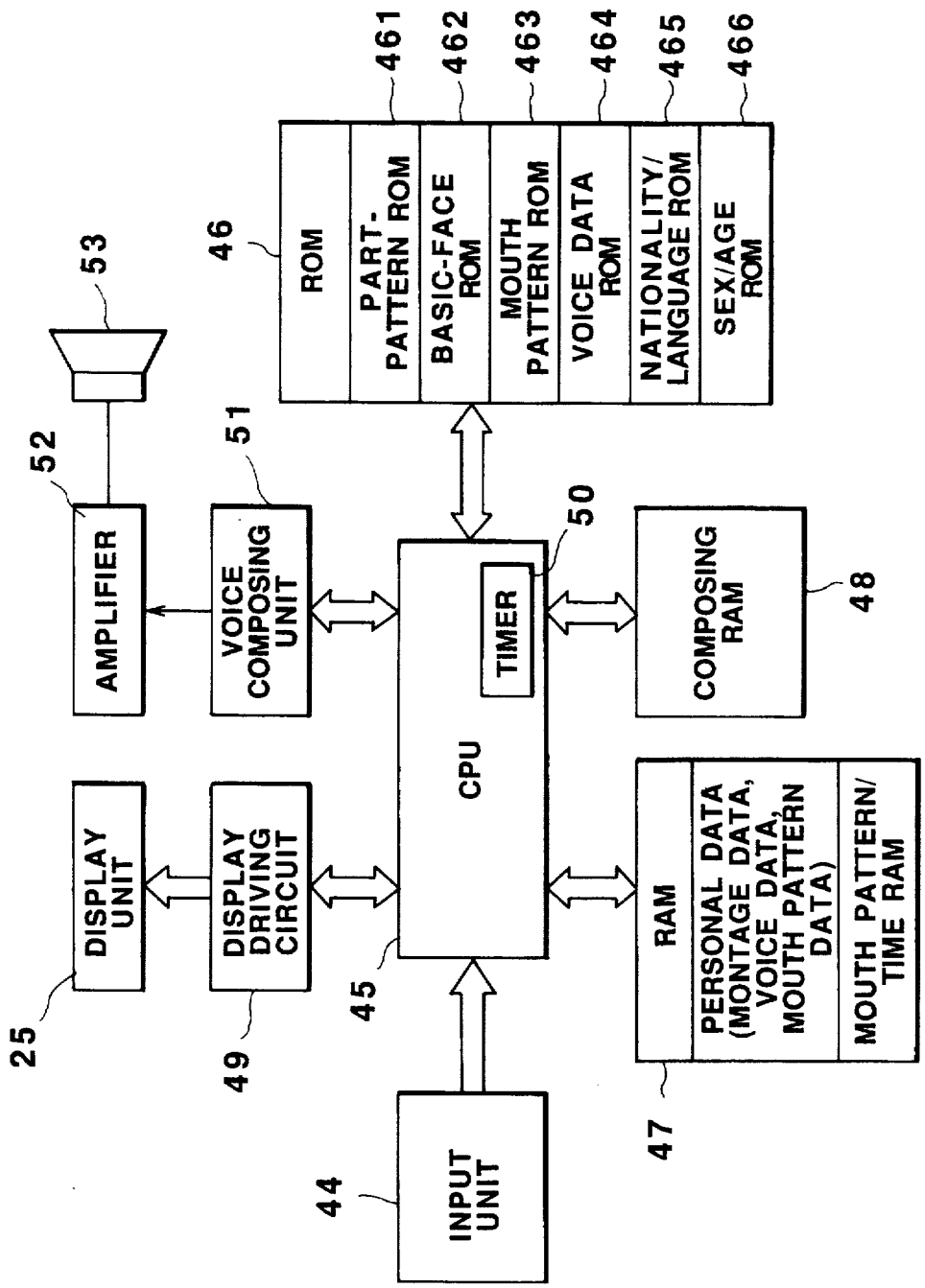
FIG. 7 is a block diagram showing a whole structure of the second embodiment of FIG. 6.

FIG. 7 is a block diagram showing a whole structure of the electronic note book 21, i.e., the second embodiment of the present invention. A key operation signal is input through an input unit 44 to a CPU 45 including a timer 50. The CPU 45 controls all of operations of the electronic note book in accordance with data previously stored in a ROM 46 and data stored in a RAM 47 and a composing RAM 48. The CPU 45 further controls a display driving circuit 49 for driving a voice composing unit 51 to produce a voice waveform. The voice waveform produced by the voice composing unit 51 is amplified by an amplifier 52, and is audibly output through a speaker 53 of the sounding unit 36.

The ROM 46 includes a part-pattern ROM 461, a basic-face ROM 462, a mouth pattern ROM 463, a voice data ROM 464, a nationality/language ROM 465 and a sex/age ROM 466. As shown in FIG. 8, the part-pattern ROM 461 stores 20 sorts of part patterns with numbers 01 to 20 for each of parts composing a face such as a face outline part, a hair style part, an eye part, a nose part and a mouth part. Though not shown in FIG. 8, the part-pattern ROM 461 further stores 20 sorts of part patterns with numbers 01 to 20 for each of parts composing a human body such as a body part, an arm part and a leg part.

Figure 15:
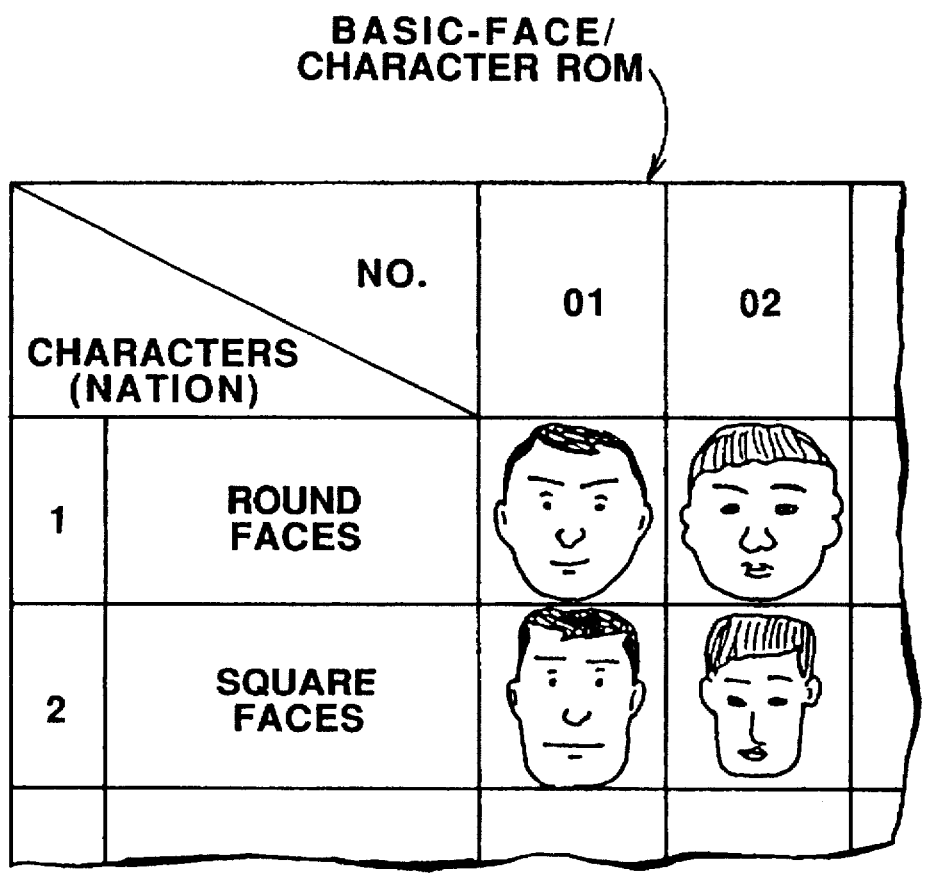
FIG. 15 is a schematic view showing a basic face/ character ROM in which basic male faces and basic female faces a Specific character are stored.

The basic-face ROM 462 comprises a basic-face/nationality ROM of FIG. 9, a basic-face/era ROM of FIG. 11, a basic-face/occupation ROM of FIG. 12, a basic-face/age ROM of FIG. 13, a basic-face/sex ROM of FIG. 14 and a basic-face/character ROM of FIG. 15. As shown in FIG. 9, in the basic-face/nationality ROM are stored ten (10) patterns of basic faces for each of one hundred (100) nationalities (1 to 100), such as Japan, Iran (Middle East) and so on. Each of these basic faces stored in the basic-face/character ROM contains several characters in appearance of a relevant nationality such as a face, a hair style and so on. As described above, in the basic-face/nationality ROM are stored basic faces of ten thousand (10,000) patterns (ten (10) patterns for each of one hundred (100) nationalities, i.e., 10,000 sorts of basic faces).

Actually, these basic faces are stored in the basic-face/nationality ROM by part numbers of the relevant part patterns composing the basic faces. More specifically, as shown in FIG. 10, in the first column of a chart are stored numbers with a hyphen such as "1-01", "1-02", "1-03", . . . and "100-10". The numbers left to the hyphen stand for a nationality while the numbers right to the hyphen stand for a pattern number of a basic face stored in the basic-face/nationality ROM. In FIG. 10, the number "1-01" represents a basic face, the nationality of which is represented by a number "1" (Japan), and which is stored at the pattern number "01" in the basic-face/nationality ROM of FIG. 7. Therefore, the basic face is composed of parts such an face outline part of "20", a hair style part of "20", an eye part of "20", a nose part of "20" and a mouth part of "20", as shown at a row of "1-01" in the chart of FIG. 10. Since ten thousand sorts of composition patterns of the basic faces are stored in the basic-face/nationality ROM of FIG. 9, ten thousand groups of part patterns of numbers from 1-01, 1-02, to 100-10 are stored in the part-pattern/nationality ROM as shown in the chart of FIG. 10.

In the basic-face/era ROM of FIG. 11 are stored a plurality of basic faces for each era, each including a hair style part representing a certain era. In the basic-face/occupation ROM of FIG. 12 are stored a plurality of basic-faces for each occupation. The basic faces stored in the basic-face/occupation ROM each include characters representing an occupation, for example a greengrocer and a painter. In the basic-face/age ROM of FIG. 13 are stored basic faces for each age. The basic faces stored in the basic-face/age ROM each include characters representing an age such as childhood, boyhood, . . . , middle age and so on.

In the basic-face/sex ROM of FIG. 14 are stored a plurality of basic male faces and a plurality of basic female faces, both for each of the hundred countries. The basic face/character ROM of FIG. 15 stores basic faces each including specific characters of a nation, such as a round face and a square face. The part numbers of part patterns (part pattern numbers) for the basic faces stored in the basic face ROMs of FIGS. 11 to 15 are stored in a similar manner to those stored as shown in FIG. 10.

Meanwhile, in the mouth pattern ROM 463 of FIG. 16 are stored a pattern group of mouth patterns pronouncing Japanese and a pattern group of mouth patterns pronouncing English. The pattern group of mouth patterns pronouncing Japanese sounds includes fifty five groups of mouth patterns each including fifty mouth patterns (1 to 50) pronouncing one of fifty five Japanese sounds such as no sound, "(A)", "(I)", "(U)" and so on. Similarly, the pattern group of mouth patterns pronouncing English sounds includes twenty six groups of mouth patters each including fifty mouth patterns (1 to 50) pronouncing one of the alphabet such as "A", "B", "C", "D" and so on.

In the voice data ROM 464 of FIG. 17 are stored voice data of one sound such as "(A)", "(I)","(E)", . . . , "A", "B", "C", . . . , and so on for each nationality, sex, and age and voice data of words "(AI)", . . . , "ABANDON" for each nationality, sex and age, where ( ) represents Japanese. In the nationality/language ROM 65 of FIG. 18 are stored relationships between nationalities and languages. More specifically, "Japan" and "Japanese" are stored at a row of A, "U.S.A." and "English" are stored at a row of B, "Spain" and "Spanish" are stored at a row of C and so on, as shown in FIG. 18. In the sex/age ROM 466 of FIG. 19 are stored codes representing sex and age. In the sex/age ROM 466, a code "0" stands for "male", a code "1" stands for "female", a code "X" represents "a child", a code "Y" represents "a high school student" and a code "Z" represents "adult". Therefore, for example, a Japanese male adult may be represented by "A (Japan) 0 (male) Z (adult)", a combination of data of the nationality/language ROM 465 and codes of the sex/age ROM 466, as shown in FIG. 20.

The RAM 47 is provided with a display register 471, a basic-face area 473, a plurality of item areas 1, 2, . . . and so on. Each item area includes a personal data area 474, a montage data area 475 and other area 476. In the personal data area 474 are written personal data such as nationality, era, occupation, age, sex, features of face, name, address and so on. In the montage data area 475 are written part numbers of part patterns (part pattern numbers) of ten parts of from a face outline part to a leg part. In other area 476 are written codes representing language, sex and age. Further in the personal data area 474 are written voice data numbers representing "ni", "ho", "n" and so on which are required to read data such as "Japan (nihon)" and "1992" stored in the other area 476, and are written mouth part numbers of mouth patterns pronouncing voice data "ni", "ho", "n" and so on. In the basic face area 473 are stored part numbers of part patterns composing the designated basic face, such as parts from a face outline part to a mouth part.

As shown in FIG. 22, part numbers of mouth patterns which are read out from the mouth pattern ROM of FIG. 16, and correspond to voice data numbers shown in FIG. 21 are stored in combination with time data respectively at addresses "1", "2", "3" and so on of a mouth pattern/time RAM of the RAM 47. The time data define time durations during which the mouth patterns are displayed. Data stored in the mouth pattern/time RAM are successively read out in order of the address, and data are displayed on a display unit 25 for respective time durations, i.e., the mouth pattern of No. 1 is displayed for 3 seconds, the mouth pattern of No. 5 is displayed for 2 seconds, the mouth pattern of No. 8 for 3 seconds, and so on. In this way, the patterns of the mouth part of a composed montage are successively switched, and thereby the mouth pattern seems to move in time.

OPERATION OF SECOND EMBODIMENT

Figure 23:
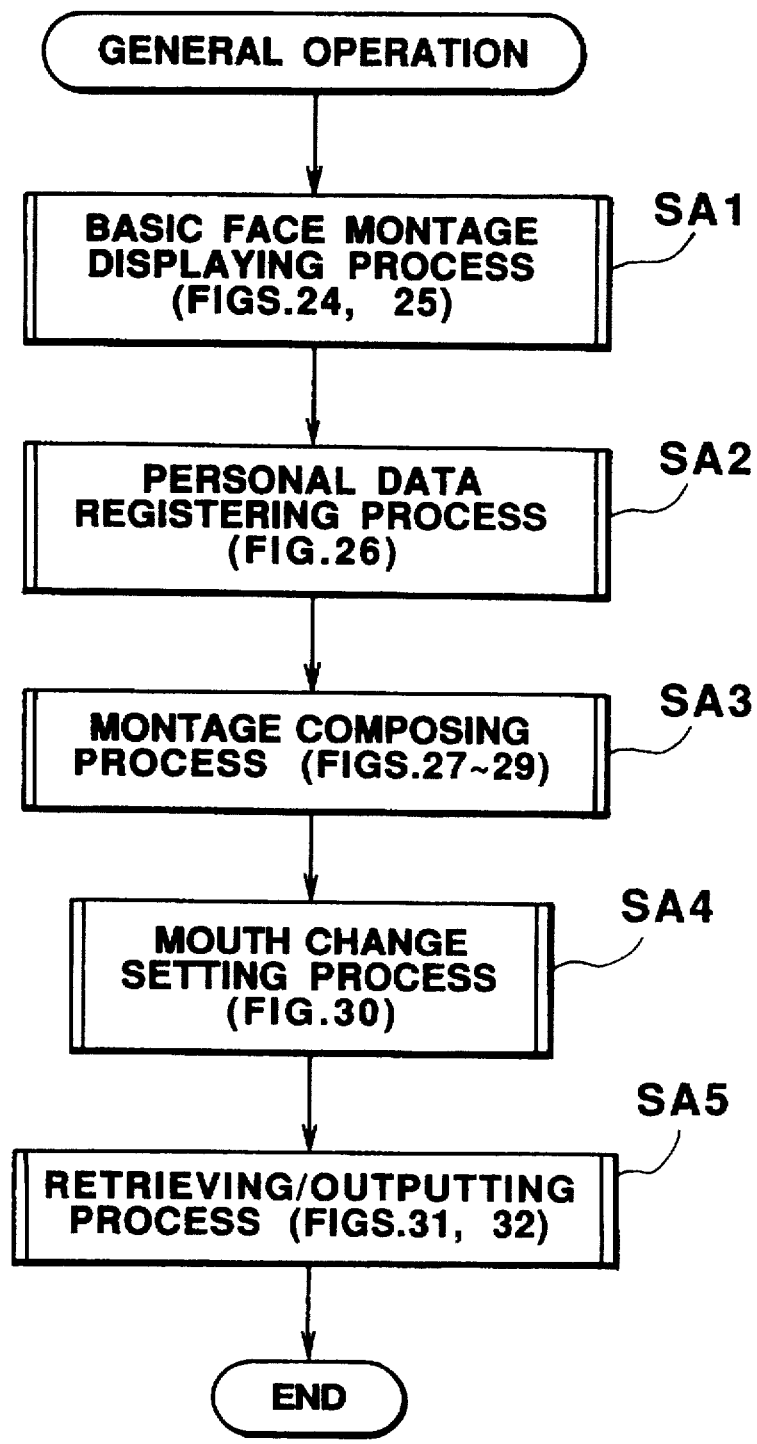
FIG. 23 is a flow chart of a general operation of the second embodiment of the montage composing apparatus of FIG. 7.

The operation of the second embodiment of the montage composing apparatus of the invention will be described with reference to the flow charts of FIGS. 23–32. FIG. 23 shows a general flow chart of the operation of the second embodiment of the montage composing apparatus. The general flow chart of FIG. 23 illustrates that the operation of the montage composing apparatus includes a basic face montage displaying process (SA1), a personal data registering process (SA2), a montage composing process (SA3), a mouth change setting process (SA4) and a retrieving/outputting process (SA5).

BASIC FACE MONTAGE DISPLAYING PROCESS

Figure 24:
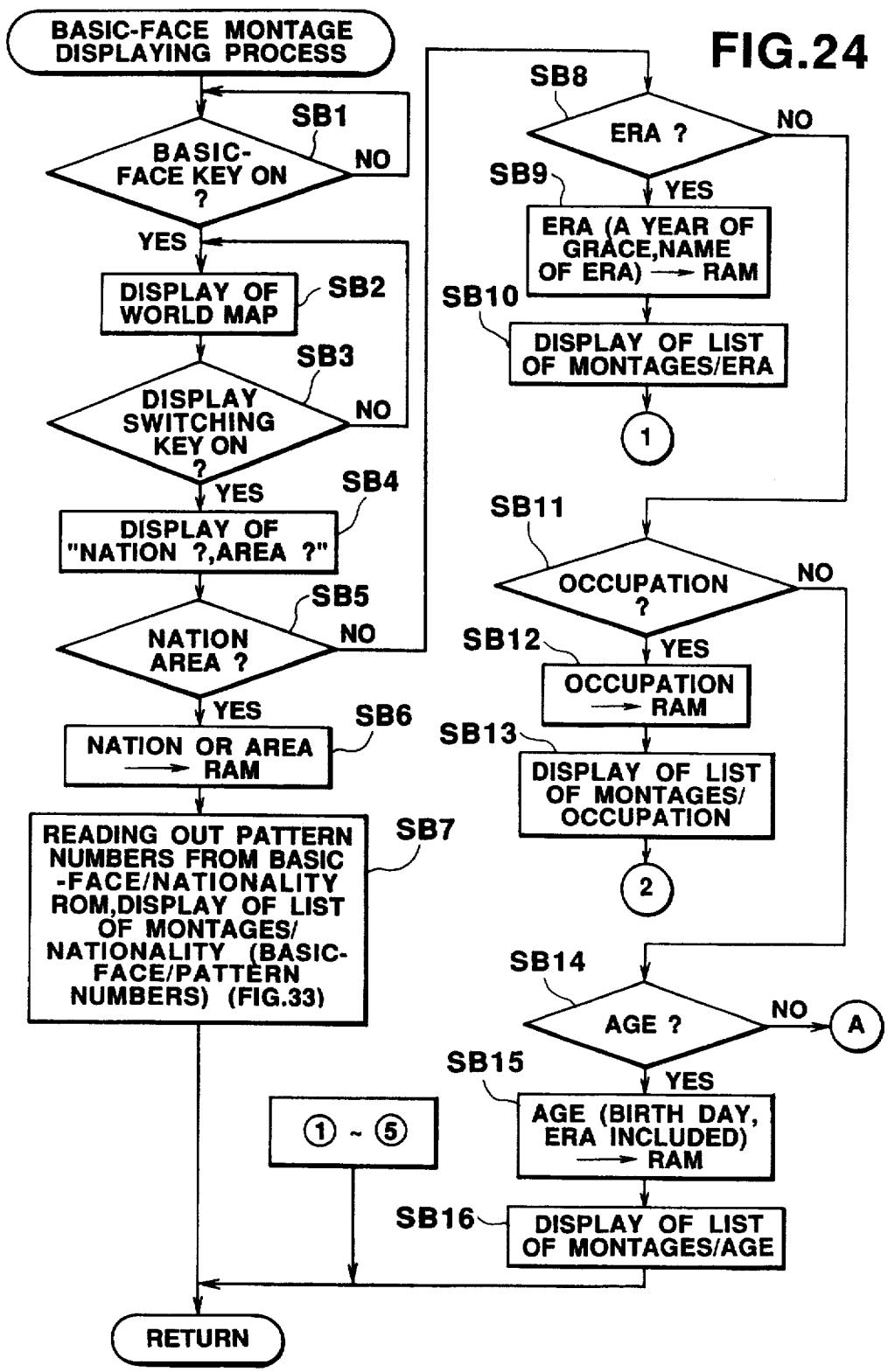
FIG. 24 is a flow chart of a montage displaying process of a basic face.
Figure 25:
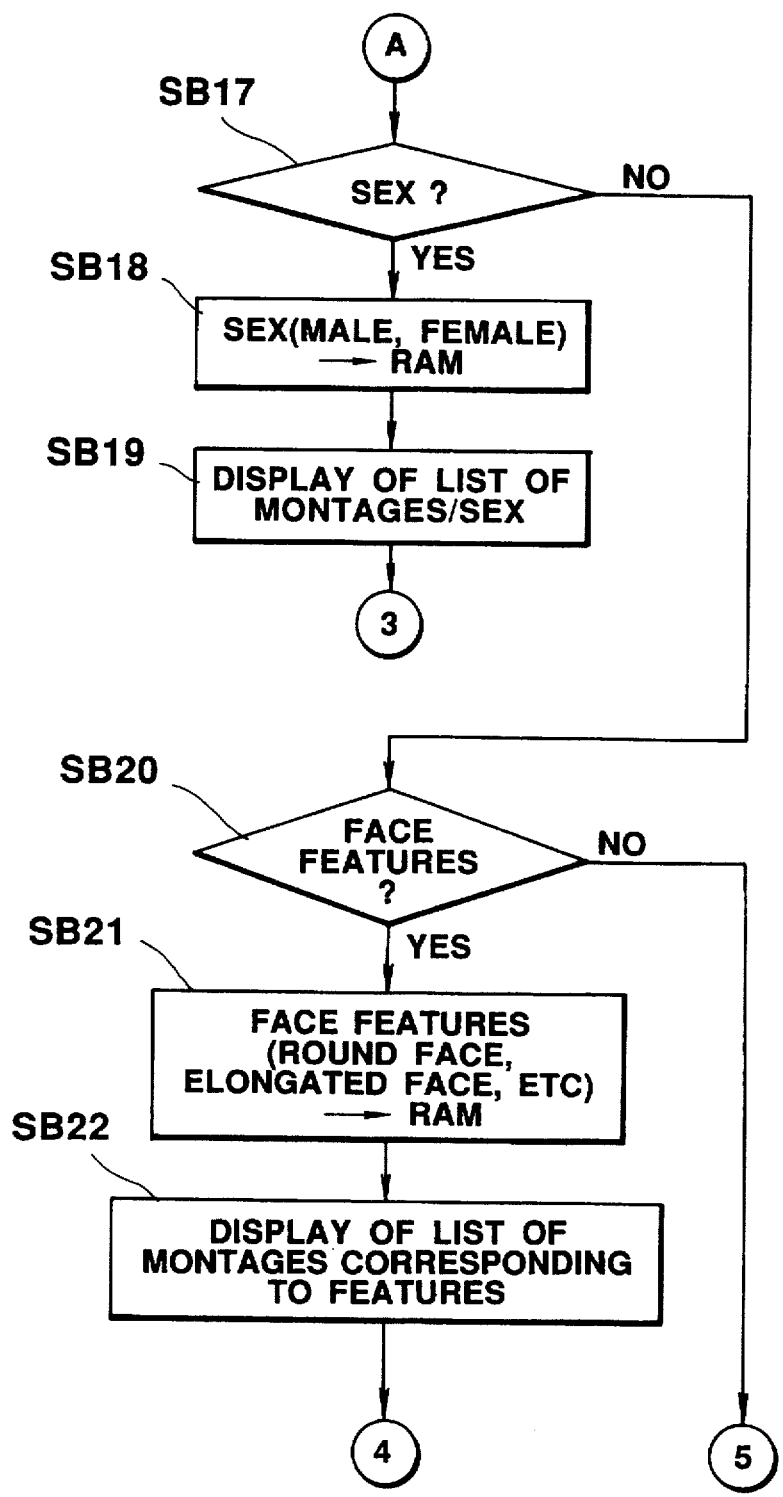
FIG. 25 is a flow chart to be connected to the flow chart of FIG. 24.

The basic face montage displaying process (SA1) is executed in accordance with the flow charts of FIGS. 24 and 25. A basic face key 26 is operated at step SB1, and then a world map is displayed on the display unit 25 at step SB2 (map data is previously stored in the ROM 46). At step SB3, the CPU 45 waits for operation of a display switching key 27. Meanwhile, the user decides a nationality and an area to be entered, referring to the world map displayed on the display unit 25.

When the nationality and area are decided and the display switching key 27 is operated, an indication of "nationality? area?" is displayed on the display unit 25 at step SB4 and the CPU 45 waits for input of the nationality and the area at step SB5. When the user operates the data input key 43 to enter the nationality and the area, the entered nationality and area are stored at the personal data area 474 of the RAM 47 at step SB6. All part numbers of part patterns in the basic-face/nationality ROM of FIG. 9 are read out, and a list of montages (basic faces and corresponding pattern numbers) corresponding to the entered nationality and area are displayed at step SB7. For instance, when a nationality of "Japan" is entered, ten basic faces corresponding to the nationality "Japan" are displayed on the display unit 25 together with lists of pattern numbers, each list including pattern numbers (from a face outline number to a mouth number) composing a basic face, as shown in FIG. 33 (actually, only three basic faces and relevant pattern numbers are illustrated in FIG. 33).

Meanwhile, when a nationality and an area are not entered at step SB5 of the flow chart of FIG. 24, it is judged at step SB8 whether an era is entered. When the user inputs a year of grace or the name of an era, the entered year and the name of the era are stored in the personal data area 474 of the RAM 47 at step SB9. Then, montages corresponding to the entered era are read out from the basic face/era ROM of FIG. 11, and are displayed in a list at step SB10. Montages corresponding to the entered year are selected out of the basic faces stored in the basic face/era ROM, and are displayed on the display unit 25.

When an era is not entered at step SB8, it is judged at step SB11 whether an occupation is entered. When an occupation is entered, the entered occupation is stored in the personal data area 474 of the RAM 47 at step SB12. Then, montages corresponding to the entered occupation are read out from the basic face/occupation ROM of FIG. 12, and are displayed on the display unit 25 in a list at step SB13. Montages corresponding to the entered occupation are selected out of the basic faces stored in the basic face/occupation ROM, and are displayed on the display unit 25.

When an occupation is not entered at step SB11, it is judged at step SB14 whether an age is entered. When an age is entered, the entered age (including a birthday and generation) is stored in the personal data area 474 of the RAM 47 at step SB16. Then, montages corresponding to the entered age are read out from the basic face/age ROM of FIG. 13, and are displayed on the display unit 25 in a list at step SB16. Montages corresponding to the entered occupation are selected out of the basic faces stored in the basic face/age ROM, and are displayed on the display unit 25.

When an age is not entered at step SB14, it is judged at step SB17 whether a sex is entered. When a sex is entered, the entered sex (male or female) is stored in the personal data area 474 of the RAM 47 at step SB18. Then, montages corresponding to the entered sex (male or female) are read out from the basic face/sex ROM of FIG. 14, and are displayed on the display unit 25 in a list at step SB19. Montages corresponding to the entered sex (male or female) are selected out of the basic faces stored in the basic face/sex ROM, and are displayed on the display unit 25.

When a sex is not entered at step SB17, it is judged at step SB20 whether face character is entered. When face character is entered, the entered face character is stored in the personal data area 474 of the RAM 47 at step SB21. Then, montages corresponding to the entered face character are read out from the basic face/character ROM of FIG. 15, and are displayed on the display unit 25 in a list at step SB22. Montages corresponding to the entered face character (male or female) are selected out of the basic faces stored in the basic face/character ROM, and are displayed on the display unit 25.

When either of processes at step SB7, SB10, SB13, SB16, SB19 and SB22 of the flow charts 24 and 25 has been finished, the process goes to "RETURN" and the above operation is performed again. For example, when "a nationality or an area" is entered in the first operation, and "era", "occupation", "age", "sex" and "face character" are entered in the following operations respectively, a nationality of "Japan", an era of "1992", an occupation of "no", sex of "male" and face character of "round face" are stored in item 1 of the personal data area 474 of the RAM 47, as shown in FIG. 21.

PERSONAL DATA REGISTERING PROCESS

Figure 26:
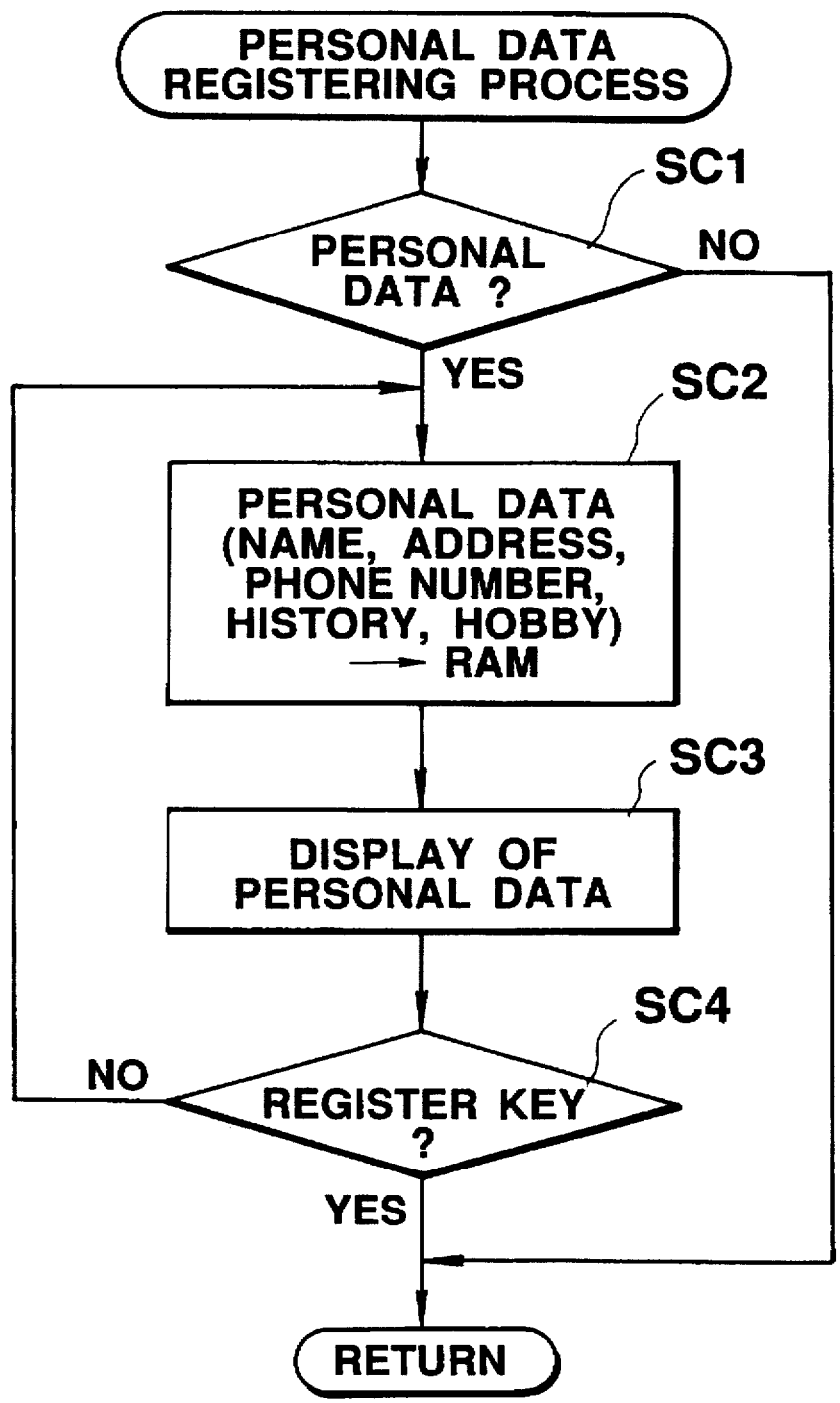
FIG. 26 is a flow chart of an individual-data registering process.

The personal data registering process at step SA2 will be performed in accordance with a flow chart of FIG. 26. At step SC1, it is judged whether personal data have been stored. When the user has entered personal data by operating the data input keys 43, the entered personal data such as a name, an address, a phone number, personal history and hobbies are stored in the personal data area 474 of the RAM 47 at step SC2. The entered personal data is displayed on the display unit 25 at step SC3, and the CPU 45 waits for operation of the register key 35 at step SC4. When the register key 35 is operated, the operation returns to the general operation shown in FIG. 23.

MONTAGE COMPOSING PROCESS

Figure 27:
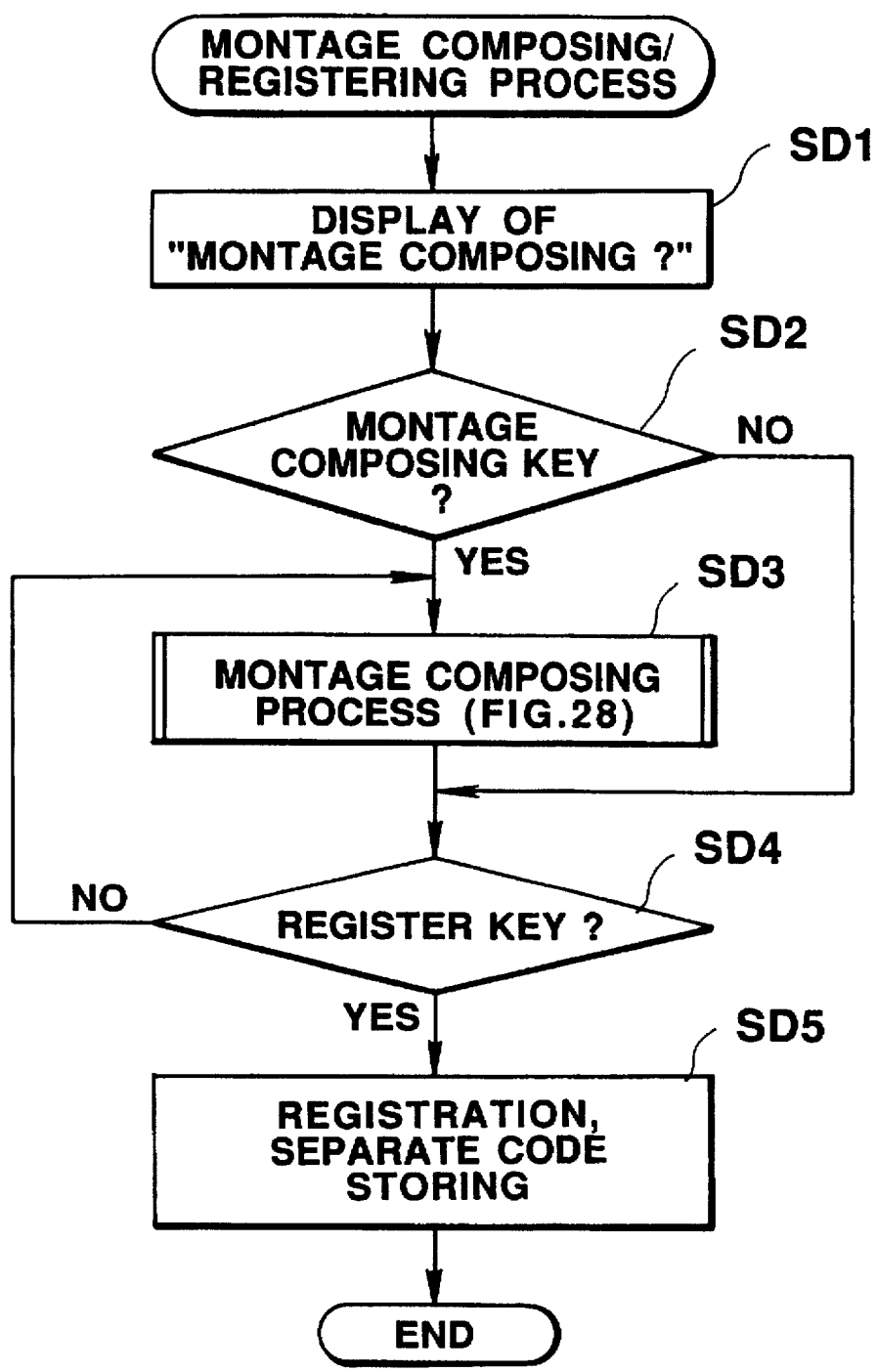
FIG. 27 is a flow chart of a montage composing/registering process.

In the montage composing process of step SA3 of FIG. 23, a montage composing/registering process is executed as shown in FIG. 27. An indication "Montage composing?" is displayed on the display unit 25 at step SD1, and the CPU 45 waits for operation of the montage composing key 37 at step SD2. When the montage composing key 37 is operated, the montage composing process is executed at step SD3. Then the CPU 45 waits for operation of the register key 35 at step SD4. When the register key 35 is operated, a registering process is executed at step SD5, wherein a composed montage is registered and a separating code is stored to separate the registered montage from a montage to be registered hereafter.

Figure 28:
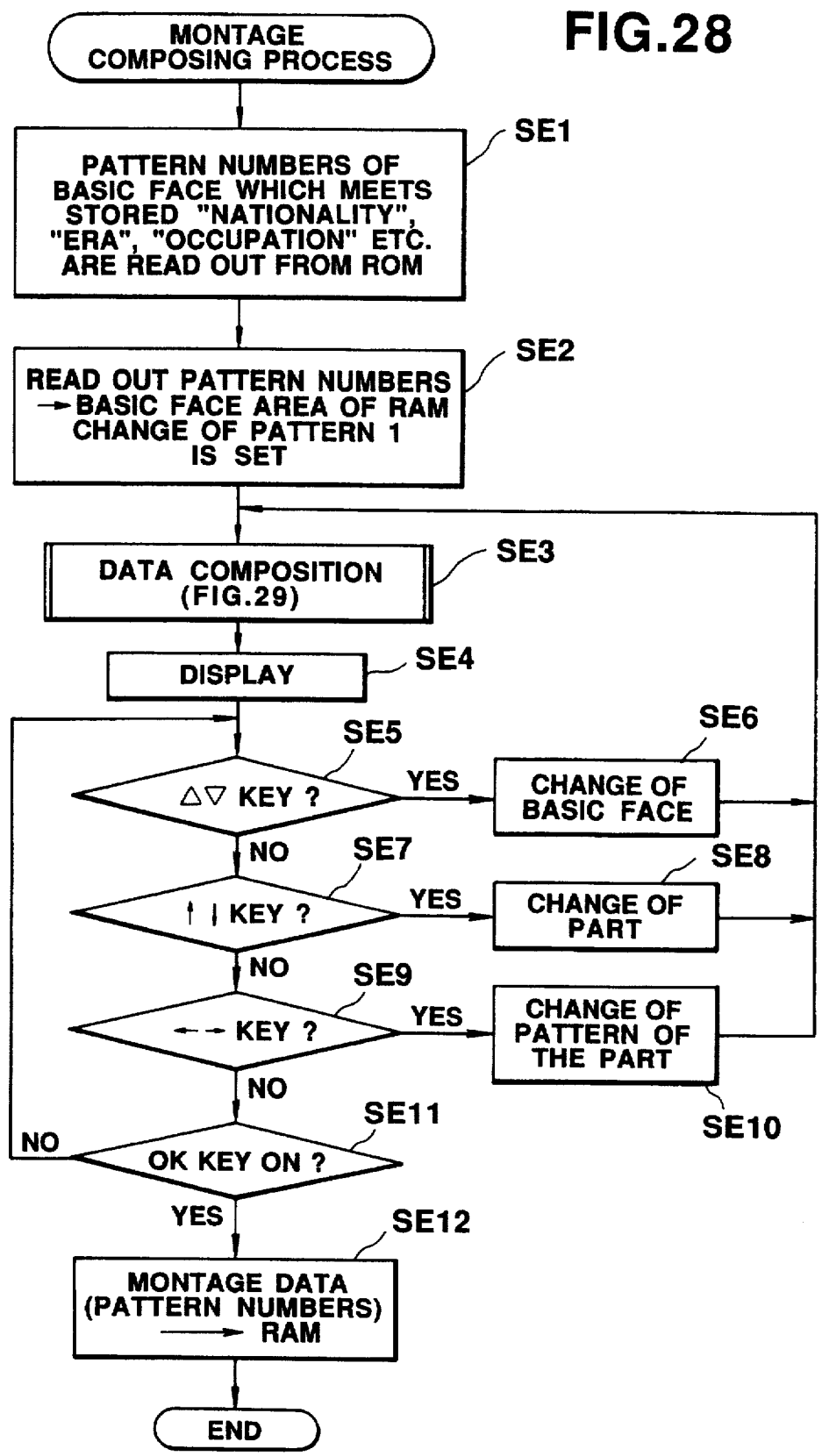
FIG. 28 is a flow chart of a montage composing process.
Figure 29:
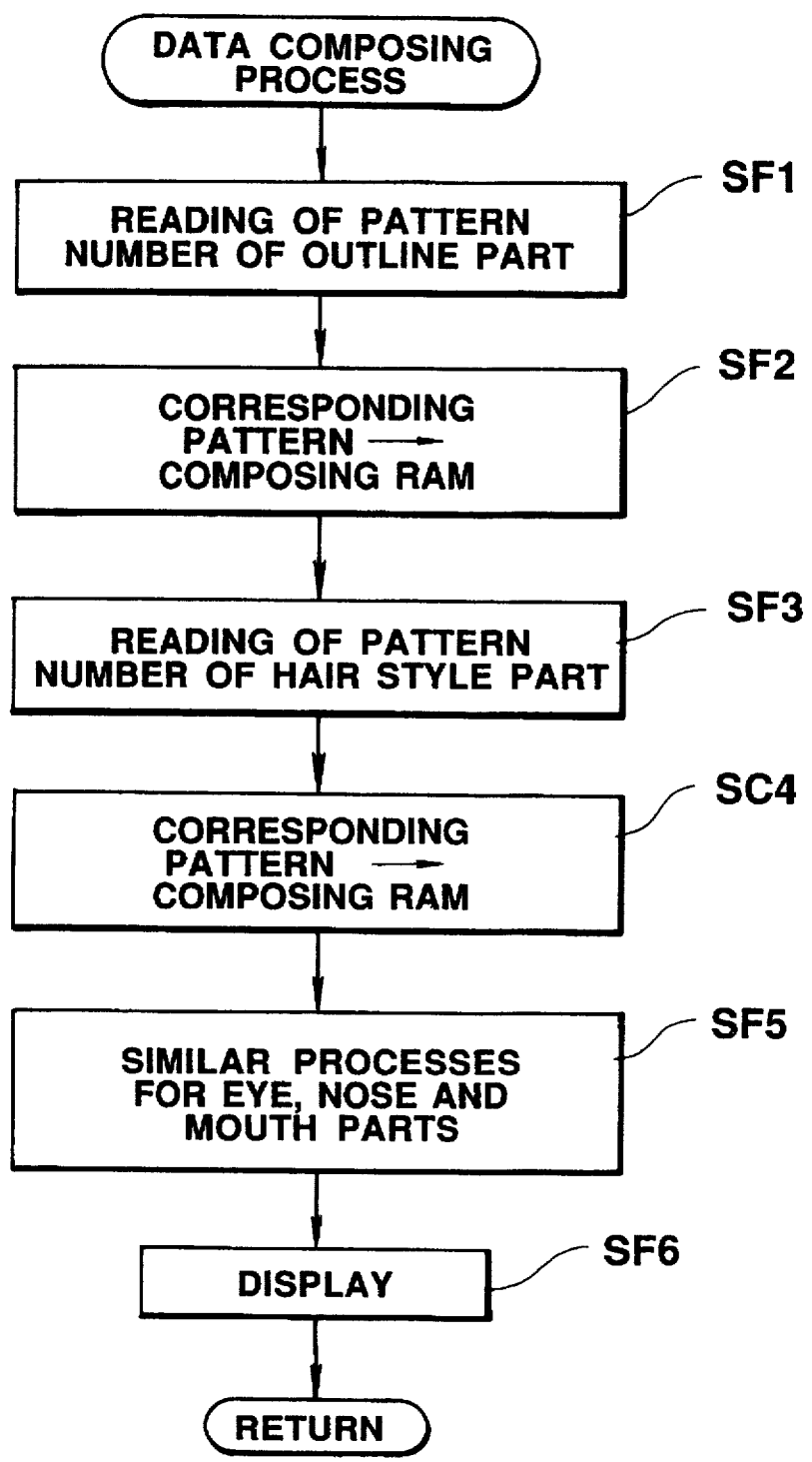
FIG. 29 is a flow chart of a data composing process.

In the montage composing/registering process of FIG. 27, the montage composing process of SD3 is executed in accordance with a flow chart shown in FIG. 28. At step SE1, part patterns of the basic face are read out from the basic face ROM, the basic face which meets conditions such as "nationality", "era", "occupation" and so on stored in the RAM 47 at step SA2 of the general operation of FIG. 23. For example, we assume that the nationality of "Egypt", the era of "1990", the occupation of "petroleum merchant" are previously stored. A basic face which meets all the above conditions is selected from either of ROMs shown in FIGS. 9 or 11–15, and all part numbers of part patterns composing the selected basic face are read out.

The read out part numbers of part patterns are stored in the basic face area 473 of the RAM 47 and a change part 1 is set at step SE2. During the process at step SE2, the pattern numbers of face parts from the face outline part to mouth part are stored respectively in areas of the basic face area 473 in the RAM 47 shown in FIG. 21. The change part 1 stands for the face outline part which is the first part among the parts such as the face outline part and the mouth part stored in the basic face area 473.

At step SE3 of FIG. 28, a data composing process is executed. The data composing process is executed in accordance with a flow chart shown in FIG. 29. The pattern number of the face outline part is read out at step SF1, and pattern data of the read out pattern number, i.e., pattern data of the face outline part is transferred to the composing RAM 48 at step SF2. Then, a pattern number of hair style part is read out at step SF3, and pattern data of the read out pattern number, i.e., pattern data of the hair style part is transferred to the composing RAM 48 at step SF4. Further, other parts such as an eye part, a nose part and a mouth part are subjected to similar processes respectively at step SF5. A montage composed in the composing RAM 48 is displayed on the display unit 25 at step SF6. As described above, immediately after the montage composing process has started, a montage of a basic face is displayed on the display unit 25 (refer to FIG. 6) which satisfies all the conditions such as the above "nationality", "era", "occupation" and so on.

When the "Δ" key 28 or "∇" key 29 is operated at step SE5 after the displaying process of the following step SE4 of FIG. 28, a basic face is changed at step SE6. When the top indicating arrow key 32 or the bottom indicating arrow key 33 is operated at step SE7, a sort of component parts (a hair style part, an eye part) is changed at step SE8. When the left indicating arrow key 30 or the right indicating arrow key 31 is operated at step SE9, a part pattern is changed at step SE10. As described above, pattern numbers of component parts (a face outline part to a mouth part) stored in the basic face area 473 of the RAM 47 are successively changed during processes at steps SE5 to SE10. A montage of a basic face is composed at step SE3 based on the changed pattern numbers, and is displayed on the display unit 25 at step SE4. When the user confirms on the display unit 25 that a montage of a basic face has been completed as desired and operates the OK key 34 at step SE11, montage data (pattern numbers of component parts such as the face outline part, the mouth part and so on) of the desired face which are stored in the basic face area 473 at that time are transferred at step SE12 to the montage data area 475 corresponding to the personal data area of the RAM 47.

MOUTH CHANGE SETTING PROCESS

Figure 30:
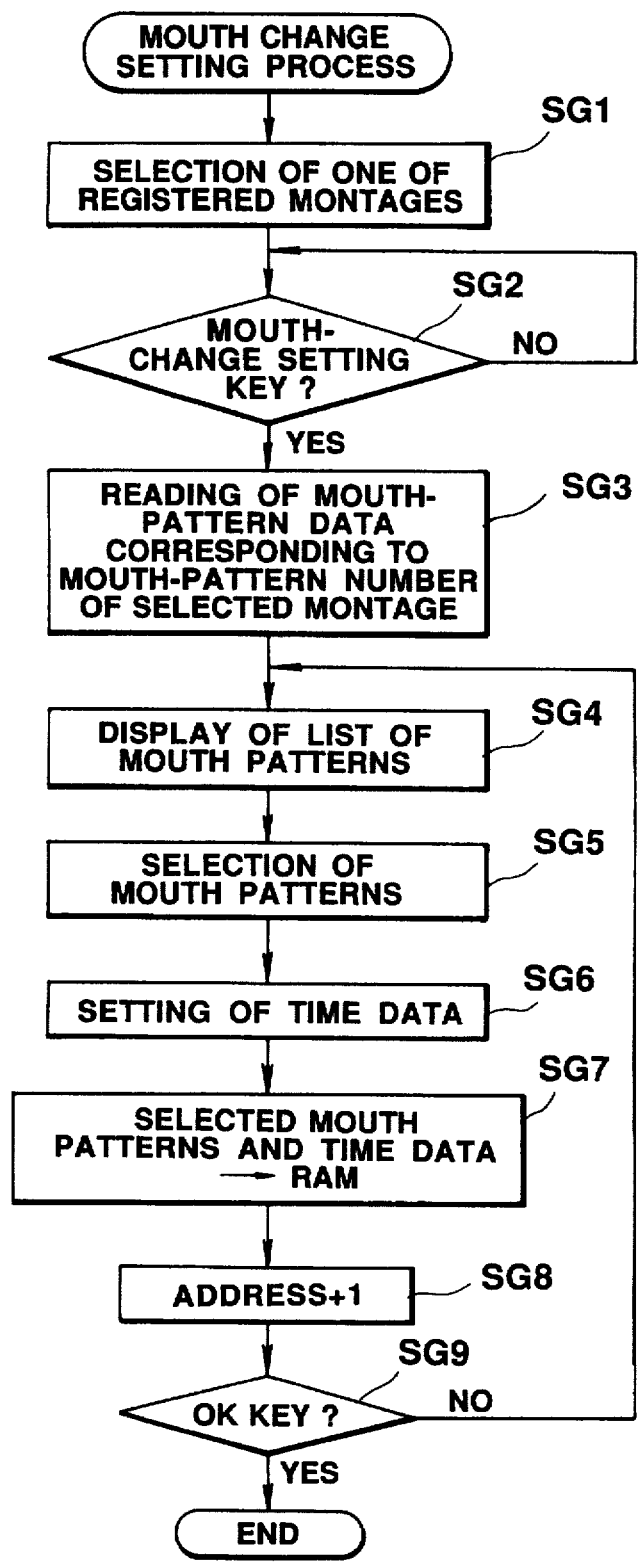
FIG. 30 is a flow chart of a mouth-pattern setting process.

The mouth change setting process at step SA4 of the general operation of FIG. 23 will be executed in accordance with a flow chart of FIG. 30. One of registered montages is selected. More specifically, relevant montage data of individuals have been registered in respective items 1, 2, . . . of the montage data area 475 during the above montage composing process at step SA3 of the general operation of FIG. 23. Montage data of either of individuals to which the user wants to set mouth change is selected from among the registered montage data at step SG1. When the mouth part change key 38 is operated at SG2, pattern data corresponding to the pattern number of the selected montage data at step SG3 is read.

For example, in case where a mouth pattern of No. 1 as illustrated in FIG. 8 has been registered as montage data of an individual, mouth pattern data corresponding to the mouth pattern of No. 1 are stored in a row No.1 shown in FIG. 16, and all the pattern data stored in the row of No. 1 are read out. The read out mouth patterns are shown simultaneously on the display unit 25 at step SG4. In other words, mouth patterns corresponding to an indication of "no sound, (A), (I), (U) and so on" ( ( ) indicates Japanese sound) are displayed on the display unit 25 at step SG4. Taking into account a language to be pronounced, the user operates the data input keys 43 to enter, for example, "(U)". Then, a mouth pattern pronouncing "(U)" is selected at step SG5. Further, the user operates data input key 43 to enter a time, thereby time data is set at step SG6 that represents a time duration for which the sound "(U)" is pronounced. At step SG7, the selected mouth pattern and the time data are stored in the mouth pattern/time RAM of FIG. 22. An address of the mouth pattern/time RAM is incremented at step SG8, and then it is judged at step SG9 whether the OK key 34 is operated. When the OK key 34 is not operated, processes at steps SG4 to SG9 are repeatedly executed. Therefore, the processes at steps SG4 to SG9 are repeatedly executed, until the OK key 34 is operated, thereby mouth patterns each in combination with a time duration are stored in the mouth pattern/time RAM in order of addresses, as illustrated in FIG. 22.

RETRIEVING/OUTPUTTING PROCESS

Figure 31:
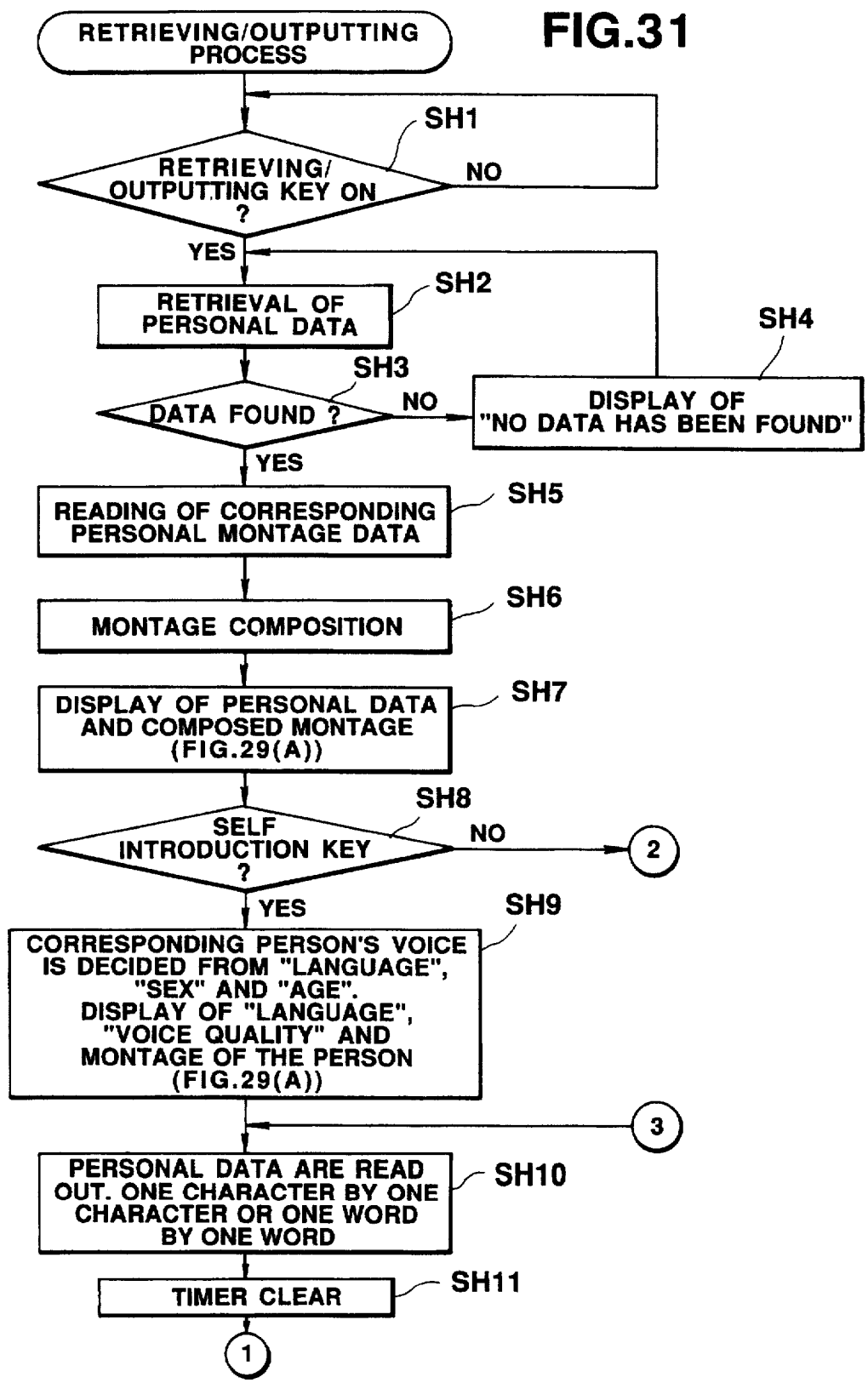
FIG. 31 is a flow chart of a retrieving/outputting process.
Figure 32:
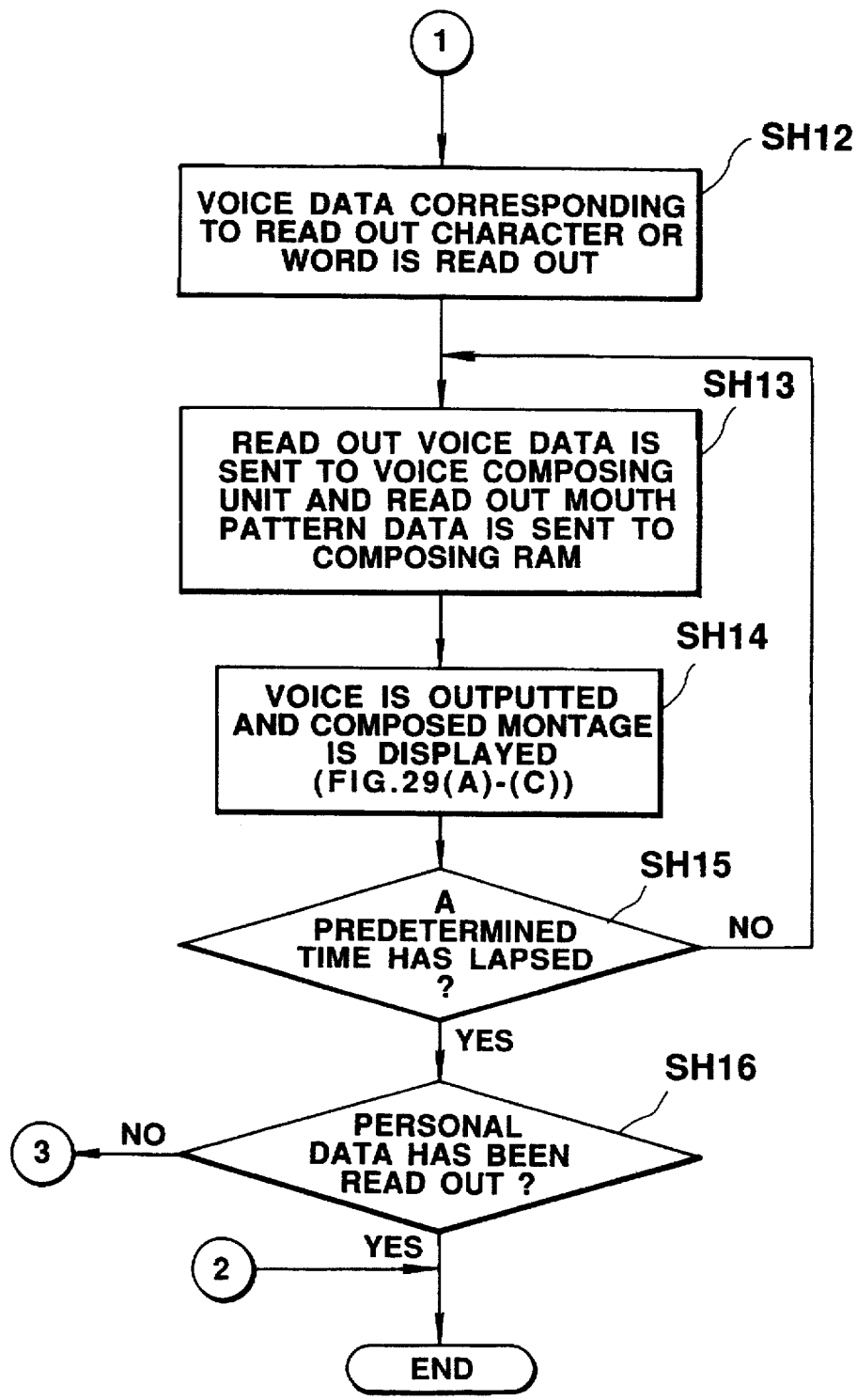
FIG. 32 is a flow chart to be connected to the flow chart of FIG. 31.

The retrieving/outputting process at step SA5 of the general operation of FIG. 23 will be executed in accordance with flow charts of FIGS. 31 and 32. The retrieving/outputting process starts at step SH1 upon operation of the retrieving/outputting key 39. When the retrieving/outputting key 39 is operated, data corresponding to personal data (name and the like) entered by operation of the data input keys 43 are retrieved in the personal data area 474 of the RAM 47 at step SH2. It is judged at step SH3 whether data corresponding to the entered name and the like are stored in the personal data area 474. When no corresponding data is stored in the personal data area, an indication of "No data has been found" is displayed on the display unit 25 at step SH4. When corresponding data has been found in the personal data area, relevant personal data and montage data are read out respectively from the personal data area 474 and the montage data area 475 of the RAM 47 at step SH5. Then, part patterns corresponding to the pattern numbers read out from the montage area 475 are combined to compose a montage at step SH6.

At the following step SH7, personal data and composed montage data are displayed on the display unit 25, wherein personal data such as nationality, era, occupation, name and so on are displayed on the display unit 25 together with a montage, as shown in FIG. 34(A). Furthermore, it is judged at step SH8 whether a self introduction key 40 is operated. When the self introduction key 40 is operated, nature of a voice to be used is decided from a language, sex, age of the corresponding individual. The language to be used and the nature of the voice are simultaneously displayed together with the personal data and the montage at step SH9. At step SH9, not only personal data but also "language: Japanese" and "voice nature: male, child" are displayed on the display unit 25.

Personal data stored in other area 467 of the RAM 47 are read out one character by one character or one word by one word at step SH10. At the time the personal data have been read out, the timer 50 is cleared at step SH11. Voice data corresponding to the read out one character or one word is read out at step SH12 from the voice data ROM of FIG. 17 corresponding to the "language to be used" and the "voice nature". The read out voice data are transferred to a voice composing unit 51. Mouth pattern data are read out from the mouth pattern/time RAM of FIG. 22 and are transferred to the composing RAM 48 at step SH13, whereby a voice is outputted and a composed montage is displayed at step SH14. Then it is judged at step SH15 whether a predetermined time (corresponding to a time stored in the mouth pattern/time RAM) has lapsed. When the time has lapsed, it is judged at step SH16 whether a reading operation of personal data has been finished. The processes at steps SH10 to SH16 are repeatedly executed until the reading operation is finished.

Therefore, if data "(ni), (ho), (n)" are stored in the RAM 47 of FIG. 21 and mouth patterns pronouncing data "(ni), (ho), (n)" are stored in the mouth pattern/time RAM of FIG. 22, sounds (ni), (ho) and (n) are successively and audibly outputted from the sounding unit 36 every lapse of the predetermined time (corresponding to a time stored in the mouth pattern/time RAM) and the mouth portion of the displayed montage moves with pronunciation of sounds (ni), (ho) and (n), as shown in FIGS. 34(A), 34(B) and 34(C).

Figure 35:
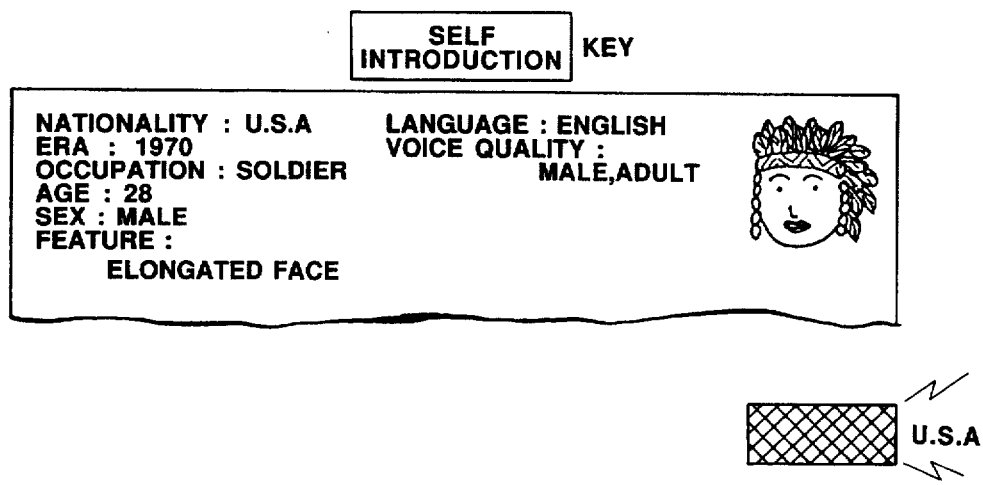
FIG. 35 is a schematic view showing another example of transition of indications on the display unit and sounding states when a self-introduction key is operated.

When other personal data is entered and data corresponding to the entered data has been found, and further the self introduction key 40 is operated, voices of "U.S. A." are outputted from the sounding unit 36 based on the personal data of an individual, and a mouth of the displayed montage changes in response to voices of "U.S. A.", as shown in FIG. 35.

In the above embodiments, an example of composing a human face has been described. In the apparatus of the present invention, pictures of arms and legs of a human body and pictures of wear may be composed. Further, a picture of a house may be composed in a similar manner, too.

Several embodiments of the present invention have been described in detail but these embodiments are simply illustrative and not restrictive. The present invention may be modified in various manners. All the modifications and applications of the present invention will be within the scope and spirit of the invention, so that the scope of the present invention should be determined only by what is recited in the present appended claims and their equivalents.

What is claimed is:

1. A picture composing apparatus for composing a picture of a human face from a plurality of element parts, each element part having plural sorts of patterns which are respectively represented by a part number, the element parts including a mouth part, and the mouth part having plural sorts of patterns, each pattern of the mouth part corresponding to a pronunciation of a fundamental sound, the picture composing apparatus comprising:

part memory means for storing plural sorts of patterns of each of said element parts including the mouth part;

pattern selecting means for selecting a pattern of an element part from among the plural sorts of patterns of the element part stored in said part memory means, and for successively selecting a plurality of patterns of the mouth part from among the plural sorts of patterns of the mouth part stored in said part memory means;

basic-face memory means for storing basic-face data which have previously been prepared based on a distinction of at least some of sex, age, nationality, era and occupation of persons whose face pictures are to be composed, each basic-face data including part numbers of element parts having patterns selected by said pattern selecting means;

mouth-patterns memory means for storing, in an order of selection, a plurality of patterns of the mouth part selected by said pattern selecting means;

basic-face selecting means for selecting a basic-face data from among the basic-face data stored in said basic-face memory means;

a display for displaying a picture of a basic face based on the basic-face data selected by said basic-face selecting means; and replacing means for successively replacing the patterns of the mouth part of the basic face displayed on said display means with another different pattern of the mouth part stored in said mouth-pattern memory means.

2. picture composing apparatus according to claim 1, further comprising:

sound memory means for storing pronunciation data of a sound corresponding to the respective patterns of the mouth part; and sounding means for reading out the pronunciation data from said sound memory means, and for audibly outputting the read out pronunciation data in response to the respective patterns of the mouth part which are successively replaced by said replacing means.

3. A picture composing apparatus according to claim 2, further comprising:

time duration setting means for setting a time duration during which the pronunciation data is audibly outputted by said sounding means.

4. A picture composing apparatus for composing a human face picture, the human face picture being comprised of plural element parts, each element part having plural pattern data, the picture composing apparatus comprising:

pattern memory means for storing pattern data of the plural element parts, pattern data of each element part being different in shape from each other;

basic-face memory means for previously storing a plurality of basic-face data which have previously been prepared based on a distinction of at least some of sex, age, nationality, era and occupation of persons whose face pictures are to be composed, each basic-face data being comprised of plural designating data, each designating data being used for designating one of the pattern data stored in said pattern memory means;

selecting means for selecting one of the basic-face data stored in said basic-face memory means;

face picture composing means for reading out from said pattern memory means pattern data designated by the designating data included in the basic-face data selected by said selecting means, and for arranging the read out pattern data at different locations respectively to compose picture data of the selected basic-face data;

a display for displaying the picture data composed by said face picture composing means; and replacing means for selecting one of the element parts of the picture data displayed on said display means, and for replacing pattern data of the selected element part with another different pattern data of the selected element part stored in said pattern memory means.

5. A picture composing apparatus according to claim 4, wherein:

said pattern memory means comprises a ROM for storing the pattern data at respective different address positions in the ROM; and each of the designating data included in the basic-face data designates an address of the ROM.

6. A picture composing apparatus according to claim 4, wherein said replacing means comprises:

a selecting switch for selecting one of the element parts of the picture data displayed on said display; and a replacing switch for replacing the pattern data of the element part selected by said selecting switch with another pattern data of the selected element part stored in said pattern memory means.

7. A picture composing apparatus according to claim 4, wherein:

said basic-face memory means previously stores basic-face data classified according to predetermined subjects; and said selecting means comprises subject designating means for designating one of predetermined subjects.

8. A picture composing apparatus according to claim 7, wherein:

said predetermined subjects include nationality, race, occupation, age and sex; and said subject designating means comprises input means for imputing one of said predetermined subjects.

9. A picture composing apparatus according to claim 8, wherein said selecting means selects one of the basic-face data stored in said basic-face memory means based on the predetermined subject input by said input means.

10. A picture composing apparatus for composing an object picture of persons, the object picture being comprised of plural element parts, each element part having plural pattern data, the picture composing apparatus comprising:

pattern memory means for storing pattern data of the plural element parts of the object picture, pattern data of each element part being different in shape from each other;

basic-object memory means for previously storing a plurality of basic-object data which have previously been prepared based on a distinction of at least some of sex, age, nationality, era and occupation of persons whose object pictures are to be composed, each basic-object data being comprised of plural designating data, each designating data being used for designating one of the pattern data stored in said pattern memory means;

selecting means for selecting one of the basic-object data stored in said basic-object memory means;

object picture composing means for reading out from said pattern memory means pattern data designated by the designating data included in the basic-object data selected by said selecting means, and for arranging the read out pattern data at different locations respectively to compose picture data of the selected basic-object data;

a display for displaying the picture data composed by said object picture composing means; and replacing means for selecting one of the element parts of the picture data displayed on said display means, and for replacing pattern data of the selected element part with another different pattern data of the selected element part stored in said pattern memory means.

11. A picture composing apparatus according to claim 10, wherein:

said pattern memory means comprises a ROM for storing the pattern data at respective different address positions in the ROM; and each of the designating data included in the basic-object data designates an address of the ROM.

12. A picture composing apparatus according to claim 10, wherein said replacing means comprises:

a selecting switch for selecting one of the element parts of the picture data displayed on said display means; and a replacing switch for replacing the pattern data of the element part selected by said selecting switch with another pattern data of the selected element part stored in said pattern memory means.

13. A picture composing apparatus according to claim 12, wherein:

said pattern memory means comprises a face-element pattern memory means for storing pattern data of face elements, the face elements composing a human face, the pattern data of the face elements representing images of face elements including eyes and a nose; and said basic-object memory means includes basic-face memory means for previously storing a plurality of basic-face data, each basic-face data being comprise of plural designating data each for designating one of the plural pattern data of the face element parts stored in said face-element pattern memory means.

14. A picture composing apparatus according to claim 10, wherein:

said basic-object memory means stores basic-object data classified according to predetermined subjects; and said selecting means comprises designating means for designating one of the predetermined subjects.

15. A picture composing apparatus according to claim 14, wherein said basic-object memory means includes basic-face memory means for storing basic face data, the basic face data being comprised of element parts including eyes and nose.

16. A picture composing apparatus according to claim 15, wherein said basic-face memory means stores basic-face data classified according to subjects including nationality, race, occupation, age and sex; and said designating means comprises input means for imputing one of said subjects.

17. A picture composing apparatus according to claim 16, wherein said selecting means selects one of the basic-face data stored in said basic-face memory means based on the subject input by said input means.

* * * * *